US012695076B2

(12) United States Patent
Stewart et al.

(10) Patent No.: US 12,695,076 B2
(45) Date of Patent: Jul. 28, 2026

(54) COLLISION CROSS SECTION MEASUREMENT IN TIME-OF-FLIGHT MASS ANALYSER

(71) Applicant: Thermo Fisher Scientific (Bremen) GmbH, Bremen (DE)

(72) Inventors: Hamish Stewart, Bremen (DE); Dmitry Grinfeld, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 163 days.

(21) Appl. No.: 18/604,359

(22) Filed: Mar. 13, 2024

(65) Prior Publication Data

US 2024/0312775 A1 Sep. 19, 2024

(30) Foreign Application Priority Data

Mar. 14, 2023 (GB) ...................................... 2303690

(51) Int. Cl.
*H01J 49/40* (2006.01)
*H01J 49/00* (2006.01)
*H01J 49/06* (2006.01)

(52) U.S. Cl.
CPC ........ *H01J 49/406* (2013.01); *H01J 49/0009* (2013.01); *H01J 49/061* (2013.01); *H01J 49/067* (2013.01)

(58) Field of Classification Search
CPC .... H01J 49/406; H01J 49/0009; H01J 49/061; H01J 49/067
See application file for complete search history.

(56) References Cited

U.S. PATENT DOCUMENTS

| | | | |
|---|---|---|---|
| 9,136,101 | B2 | 9/2015 | Grinfeld et al. |
| 9,536,722 | B2 | 1/2017 | Grinfeld et al. |
| 9,613,787 | B2 | 4/2017 | Furuhashi et al. |
| 10,699,888 | B2 | 6/2020 | Giannakopulos et al. |

(Continued)

FOREIGN PATENT DOCUMENTS

| | | | |
|---|---|---|---|
| GB | 2580089 | A | 7/2020 |
| WO | 2011080959 | A1 | 7/2011 |

OTHER PUBLICATIONS

Verenchikov et al., "Multiplexing in multi-reflecting TOF MS," Journal of Applied Solution Chemistry and Modeling, 6(1): 1-22 (2017).

(Continued)

*Primary Examiner* — Hugh Maupin
(74) *Attorney, Agent, or Firm* — Klarquist Sparkman, LLP

(57) ABSTRACT

A time-of-flight (ToF) mass analyser determines mass to charge ratio (m/z) of ions by determining flight times along an ion path. In first and second modes of operation, flight times of the ions along the ion path are determined to obtain respective first and second sets of data. In the first and second modes, the ion path has first and second path lengths and the paths are maintained at first and second pressures, respectively, wherein the first and second path lengths and/or the first and second pressures are different. An ion peak in the first set of data is compared to a corresponding ion peak in the second set of data, and a collision cross section of the associated ions is determined based on the comparison.

21 Claims, 9 Drawing Sheets

(56) References Cited

U.S. PATENT DOCUMENTS

| | | | | |
|---|---|---|---|---|
| 2006/0289746 | A1* | 12/2006 | Raznikov | G01N 27/623 250/288 |
| 2010/0200742 | A1* | 8/2010 | Schultz | H01J 49/107 250/252.1 |
| 2012/0235034 | A1 | 9/2012 | Shiokawa et al. | |
| 2019/0237318 | A1* | 8/2019 | Brown | H01J 49/405 |
| 2021/0210330 | A1* | 7/2021 | Verenchikov | H01J 49/005 |

OTHER PUBLICATIONS

Sanders et al., "Determination of collision cross-sections of protein ions in an orbitrap mass analyzer," Analytical Chemistry, 90(9): 5896-5902 (2018).

Combined Search and Examination Report under Sections 17 and 18(3) from GB 2303690.8, dated Sep. 29, 2023, 5 pages.

* cited by examiner

FIG. 11A
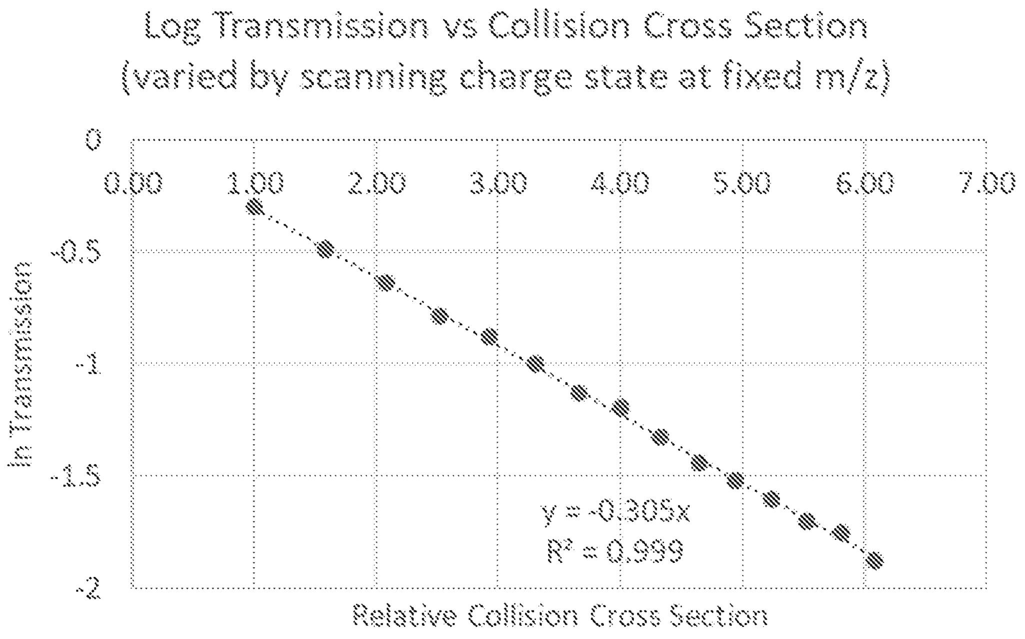
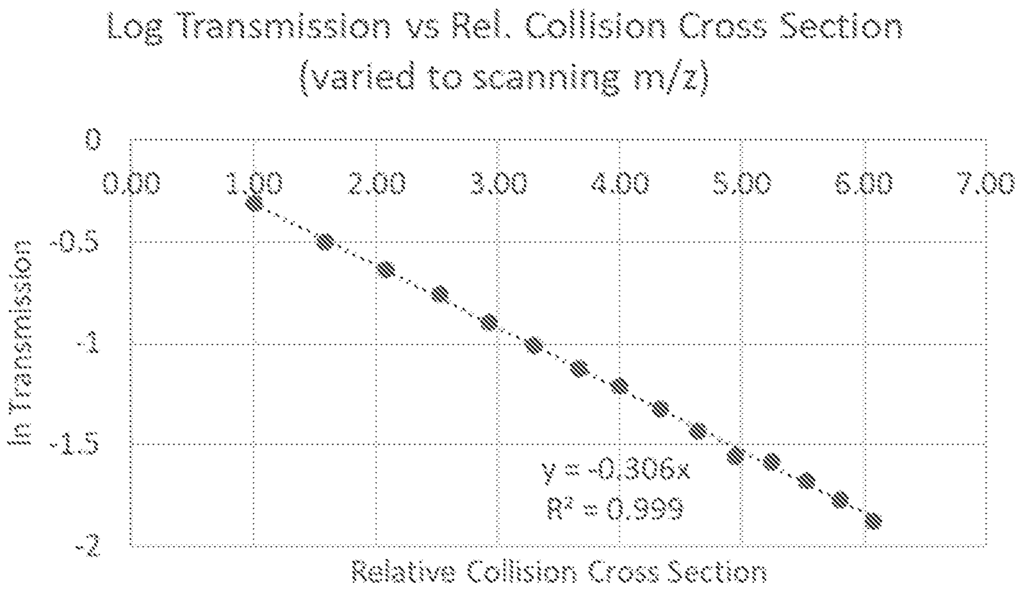
FIG. 11B

COLLISION CROSS SECTION MEASUREMENT IN TIME-OF-FLIGHT MASS ANALYSER

CROSS REFERENCE TO RELATED APPLICATION

This application claims priority from application GB 2303690.8, filed Mar. 14, 2023. The entire disclosure of application GB 2303690.8 is incorporated herein by reference.

FIELD OF THE INVENTION

The present invention relates to methods of analysing ions, and in particular to time-of-flight (ToF) mass analysers.

BACKGROUND

In time-of-flight (ToF) mass analysers, ions are passed through a flight region of the mass analyser and are eventually detected by a detector. The mass to charge ratio (m/z) of the ions is determined from the ion's flight time through the flight region.

It is believed that there remains scope for improvements to methods of operating ToF mass analysers.

SUMMARY

A first aspect provides a method of operating a time-of-flight (ToF) mass analyser that is configured to determine the mass to charge ratio (m/z) of ions by determining flight times of ions along an ion path, the method comprising:

- operating the mass analyser in a first mode of operation, and analysing ions by determining flight times of the ions along the ion path so as to obtain a first set of data, wherein in the first mode of operation (i) the ion path has a first path length, and (ii) the ion path is maintained at a first pressure;
- operating the mass analyser in a second mode of operation, and analysing ions by determining flight times of the ions along the ion path so as to obtain a second set of data, wherein in the second mode of operation (i) the ion path has a second path length, and (ii) the ion path is maintained at a second pressure, wherein the second path length is different to the first path length and/or the second pressure is different to the first pressure;
- comparing an intensity of an ion peak in the first set of data to an intensity of a corresponding ion peak in the second set of data; and
- determining, on the basis of the comparison, a collision cross section (CCS) of the ions associated with the corresponding ion peaks.

Embodiments relate to a method of operating a time-of-flight mass analyser that is configured to determine the mass to charge ratio (m/z) of ions by determining (i.e. measuring) the flight times of the ions along an ion path. In the method, the ToF mass analyser is used to determine the collision cross section (CCS) of ions. This is done by obtaining two sets of data, where one or both of (i) the ion path length and (ii) the gas pressure in the ion path is changed between the two sets of data. As is described in more detail below, by comparing the intensity of corresponding ion peaks in the two sets of data, the CCS of the ions giving rise to the corresponding ion peaks can be determined.

The time-of-flight (ToF) mass analyser may form part of an analytical instrument such as a mass spectrometer. The instrument may comprise an ion source, wherein ions can be generated by ionising a sample in the ion source. The ion source may be coupled to a separation device such as a liquid chromatography (LC) separation device, such that the sample which is ionised in the ion source comes from the separation device.

The ions generated by the ion source may be passed to the ToF mass analyser via one or more ion optical devices arranged in the analytical instrument between the ion source and the mass analyser. The one or more ion optical devices may comprise any suitable arrangement of one or more ion guides, one or more lenses, one or more gates, and the like. The one or more ion optical devices may include one or more transfer ions guides for transferring ions, and/or one or more mass selector or filters for mass selecting ions, and/or one or more ion cooling ion guides for cooling ions, and/or one or more collision or reaction cells for fragmenting or reacting ions, and so on. One or more or each ion guide may comprise a multipole ion guide such as a quadrupole ion guide, hexapole ion guide, etc., a segmented multipole ion guide, a stacked ring type ion guide, and the like.

The ToF mass analyser is configured to determine the mass to charge ratio (m/z) of ions by determining the ions' flight times along an ion path. The mass analyser may comprise an ion injector arranged at the start of the ion path, and an ion detector arranged at the end of the ion path. The ion injector may be configured to receive ions from the ion source via the one or more ion optical devices. The ion injector may be configured to inject (received) ions into the ion path (e.g. by accelerating ions along the ion path), whereupon ions travel along the ion path to the detector. The ion injector can be in any suitable form, such as for example an ion trap, or one or more (e.g. orthogonal) acceleration electrodes. Upon reaching the detector, the ions may be detected by the detector, and e.g. their arrival time may be recorded. The mass to charge ratio of the ions may then be determined from the measured flight time.

The ToF mass analyser can comprise any suitable type of ToF mass analyser, such as a linear ToF mass analyser, a reflectron ToF mass analyser, a multi-reflection time-of-flight (MR-ToF) analyser, or a closed-loop multi-reflection mass analyser. Similarly, the ion path may have any suitable form, such as being linear in the case of a linear ToF mass analyser, or including one or more reflections in the case of a ToF analyser comprising a reflectron or a multi-reflection time-of-flight (MR-ToF) analyser.

In particular embodiments, the analyser is a multi-reflection time-of-flight (MR-ToF) mass analyser. Thus, the analyser may comprise two ion mirrors spaced apart and opposing each other in a first direction X, each mirror elongated generally along a drift direction Y, the drift direction Y being orthogonal to the first direction X, an ion injector for injecting ions into a space between the ion mirrors, and a detector for detecting ions after they have completed one or more oscillation(s) between the ion mirrors. Each mirror may be elongated generally along the drift direction Y between a first end and a second end.

The ion injector may be located in proximity with the first end of the ion mirrors, and the detector may be located in proximity with the first end of the ion mirrors. In this case, the mass analyser may be configured to mass analyse ions by: injecting ions from the ion injector into the space between the ion mirrors, wherein the ions follow an ion path having one or more (K) oscillation(s) between the ion mirrors in the direction X whilst: (a) drifting along the drift direction Y towards the second end of the ion mirrors, (b) reversing drift direction velocity, and (c) drifting back along the drift direction Y to the first end of the ion mirrors; and then causing the ions to travel to the detector for detection.

Alternatively, the ion injector may be located in proximity with the first end of the ion mirrors, and the detector may be located in proximity with the second end of the ion mirrors. In this case, the mass analyser may be configured to mass analyse ions by: injecting ions from the ion injector into the space between the ion mirrors, wherein the ions follow an ion path having one or more (K) oscillation(s) between the ion mirrors in the direction X whilst drifting along the drift direction Y towards the second end of the ion mirrors, until the ions to travel to the detector for detection.

Thus, in general, the analyser may be configured to analyse ions by: injecting ions from the ion injector into the space between the ion mirrors, such that the ions follow an ion path having one or more (K) oscillation(s) between the ion mirrors in the direction X whilst drifting in the drift direction Y from the ion injector to the detector.

The multi-reflection time-of-flight (MR-ToF) mass analyser may further comprise a deflector and/or lens located in proximity with the first end of the ion mirrors. The deflector and/or lens may be located approximately equidistant (in the X direction) between the first and second ion mirrors. The deflector and/or lens may be arranged along the ion path after the first ion mirror reflection (in the first ion mirror) that the ion beam experiences after being injected from the injector, but before its second ion mirror reflection (in the second ion mirror). Correspondingly, where the detector is arranged at the first end of the ion mirrors, the deflector or lens may be arranged along the ion path before the final ion mirror reflection (in the second ion mirror) that the ion beam experiences before arriving at the detector, but after its penultimate ion mirror reflection (in the first ion mirror).

The multi-reflection time-of-flight (MR-ToF) mass analyser can be any suitable type of MR-ToF. For example, the analyser can be an MR-ToF having a set of periodic lenses configured to keep the ion beam focused along its flight path, e.g. as described in the article A. Verenchikov, et al., Journal of Applied Solution Chemistry and Modelling, 2017, 6, 1-22.

However, in particular embodiments, the analyser is a titled-mirror type multi-reflection time-of-flight mass analyser, e.g. of the type described in U.S. Pat. No. 9,136,101, the contents of which are incorporated herein by reference. Thus, the ion mirrors may be a non-constant distance from each other in the X direction along at least a portion of their lengths in the drift direction Y. The drift direction velocity of ions towards the second end of the ion mirrors may be opposed by an electric field resulting from the non-constant distance of the two mirrors from each other. This electric field may cause the ions to reverse their drift direction velocity in proximity with the second end of the ion mirrors and drift back along the drift direction towards the deflector.

Alternatively, the analyser may be a single focussing lens type multi-reflection time-of-flight mass analyser, e.g. of the type described in UK patent No. 2,580,089, the contents of which are incorporated herein by reference. Thus, the deflector may be a first deflector, and the analyser may comprise a second deflector located in proximity with the second end of the ion mirrors. The second deflector may be configured to cause the ions to reverse their drift direction velocity in proximity with the second end of the ion mirrors and drift back along the drift direction towards the deflector. To do this, a suitable voltage may be applied to the second deflector, e.g. in the manner described in UK patent No. 2,580,089.

In embodiments, the (or each) deflector may comprise one or more trapezoid shaped or prism-like electrodes arranged adjacent to the ion beam. This deflector design has a suitably wide acceptance, such that an ion beam that is spread out relatively broadly in the drift direction can be properly received and deflected by the deflector. The deflector may comprise a first trapezoid shaped or prism-like electrode arranged above the ion beam and a second trapezoid shaped or prism-like electrode arranged below the ion beam. The electrode(s) may be angled with respect to the ion beam, such that when suitable (DC) voltage(s) is (are) applied to the electrode(s), the resulting electric field induces a deflection in the ion beam. Suitable deflection voltages are of the order of ±tens of volts, or ±hundreds of volts.

The deflector should be (and in embodiments is) configured such that it can cause the ion beam to be deflected by a desired (selected) angle. The angle by which the ion beam is deflected by the deflector may be adjustable, e.g. by adjusting the magnitude of a (DC) voltage(s) applied to the deflector. The deflector may be configured such that it can deflect the ion beam by any suitable and desired angle. Adjusting the angle by which the ion beam is deflected by the deflector may have the effect of controlling the number (K) of oscillation(s) that ions make between the ion mirrors in the direction X whilst travelling in the drift direction Y between the ion injector and the detector. As used herein, an oscillation between the ion mirrors in the direction X should be understood as meaning that ions are reflected once by each of the first and second ion mirrors. That is, in a single ion oscillation between the ion mirrors, ions experience two ion mirror reflections.

In the method, the analyser is initially operated in a first mode of operation, and ions are analysed when the analyser is being operated in the first mode of operation (by determining flight times of ions along the ion path) so as to obtain a first set of data. The analyser is then switched to operate in a second mode of operation, and ions are analysed when the analyser is being operated in a second mode of operation (by determining flight times of ions along the ion path) so as to obtain a second set of data. The first and second sets of data may be mass spectral data, e.g. in the form of, or representative of, a time-of-flight spectrum or a mass spectrum.

Analysing ions in the first mode of operation may comprise analysing one or more first packets of ions, e.g. by injecting each first packet of ions into the ToF analyser, and analysing ions in the second mode of operation may analysing one or more second different packets of ions, e.g. by injecting each second packet of ions into the ToF analyser. The first and second packets of ions may be ions derived from the same sample or the same region of the sample (e.g. generated from adjacent regions of a sample, and/or generated from a sample at close (adjacent) points in time), e.g. so that the first packet(s) of ions has substantially similar or the same ion composition as the second packet(s) of ions.

In the first mode of operation (i) the ion path has a first path length, and (ii) the ion path is maintained at a first pressure, and in the second mode of operation (i) the ion path has a second path length, and (ii) the ion path is maintained at a second pressure. In the second mode of operation, one or both of the ion path length and the ion path pressure (i.e. the pressure in the flight region) is changed relative to the first mode of operation, i.e. such that (i) the second path length is different to the first path length, and/or (ii) the second pressure is different to the first pressure. As is described further below, by changing the path length and/or pressure between the two analyses, a comparison of the intensity of corresponding ion peaks in the two sets of data can allow the collision cross section (CCS) of the ions giving rise to those corresponding ion peaks to be determined.

Thus, in some embodiments, the ion path pressure is changed between a first pressure in the first mode of operation and a second different pressure in the second mode of operation. The second pressure may be greater than the first pressure. For example, the second pressure may be about 5 times, 10 times, 20 times, 30 times, 40 time, 50 times, 100 times or 200 times greater than the first pressure. The optimum pressures will depend on the mass of the ions of interest. Typically, the first pressure may be around $5\times10^{-9}$ mbar, and the second pressure may be around $1\times10^{-7}$ mbar or $5\times10^{-7}$ mbar, but other pressures would be possible.

In these embodiments, the pressure of the ion path may be changed in any suitable manner. For example, the ion path may be arranged within a vacuum chamber (optionally together with the ion injector and the detector), and one or more vacuum pump(s) may be connected to the vacuum chamber and may be configured to pump the vacuum chamber, i.e. so as to maintain the vacuum chamber at a desired (vacuum) pressure. The pressure of the ion path may be altered between the first and second modes of operation by injecting (additional) gas into the vacuum chamber and/or by altering the pumping speed of the vacuum pump(s). In particular embodiments, a turbopump is configured to pump the vacuum chamber, and the pressure of the ion path is altered between the first and second modes of operation by altering the speed of the turbopump.

It will be understood that, beneficially, these embodiments are applicable to a wide variety of ToF mass analyser types (i.e. since the analyser need not have a variable ion path length). However, changing the pressure within the flight region of a ToF mass analyser is relatively slow, and may be too slow for compatibility with the relatively high repetition rates of ToF mass analysers.

Thus, in further embodiments, the ToF mass analyser is of a type that has a variable ion path length, and the ion path length is changed between the first mode of operation and the second mode of operation. Beneficially, the ion path length can be changed relatively quickly, e.g. on the timescale of the repetition rate of the ToF mass analyser, and using only electrical control (i.e. by changing one or more voltages, and without recourse to moving parts). In these embodiments, the pressure of the ion path may be maintained constant between the first and second modes, i.e. the first pressure may be approximately equal to the second pressure. However, it would also be possible to change both the ion path length and the ion path pressure between the first and second modes of operation.

The second path length may be greater than the first path length. For example, the second path length may be about 5 times, 10 times, 20 times, 30 times, 40 times, 50 times, or 100 times greater than the first path length. The optimum lengths will depend on the mass of the ions of interest and the pressure of the ion path. Typically, the first path length may be around 1 m, and the second path length may be around 25 m, but other path lengths would be possible.

In these embodiments, the ion path length may be changed between the first length and the second length in any suitable manner. In general, the time-of-flight mass analyser may comprise one or more ion reflectors. In the first mode of operation ions may be caused to make n reflection(s) in the one or more ion reflectors, wherein n is an integer ≥0. In the second mode of operation ions may be caused to make m reflection(s) in the one or more ion reflectors, wherein m is an integer >n. In general, an "ion reflector" may be, for example, an ion mirror, a reflectron, an ion deflector, a lens, or similar.

For example, in some embodiments, the ion path length is changed by changing from a mode having zero reflections (i.e. linear ToF ion path) to a mode having a single reflection. In some embodiments, the ion path length is changed by switching between a V-shaped ion flight path and a W-shaped ion flight path.

Where the analyser is a multi-reflecting time-of-flight (MR-ToF) mass analyser (as described above), the ion path length may be changed by switching between a first mode of operation in which the ions complete a first number $K_1$ of oscillation(s) between the ion mirrors in the direction X whilst drifting in the drift direction Y from the ion injector to the detector, and a second mode of operation in which the ions complete a second different (greater) number $K_2$ of oscillations between the ion mirrors in the direction X whilst drifting in the drift direction Y from the ion injector to the detector.

For example, where the analyser is a multi-reflecting time-of-flight (MR-ToF) mass analyser (as described above), the method may comprise altering the second path length in the second mode of operation by altering the number K of oscillations that ions make between the ion mirrors when following the zigzag ion path. This may be done by altering the angle by which the ion beam is deflected by the deflector, i.e. by altering the voltage applied to the deflector. Suitable deflection voltage shifts to alter the angle of the beam in this manner are of the order of a few volts or tens of volts.

Thus, in the first mode of operation, the analyser may be configured such that ions make a first number $K_1$ of oscillations between the ion mirrors in the direction X whilst: (a) drifting along the drift direction Y from the deflector towards the second end of the ion mirrors, (b) reversing drift direction velocity in proximity with the second end of the ion mirrors, and (c) drifting back along the drift direction Y to the deflector. In the second mode of operation, the analyser may be configured such that ions make a second different (greater) number $K_2$ of oscillations between the ion mirrors in the direction X whilst: (a) drifting along the drift direction Y from the deflector towards the second end of the ion mirrors, (b) reversing drift direction velocity in proximity with the second end of the ion mirrors, and (c) drifting back along the drift direction Y to the deflector.

In further embodiments, one or more additional deflectors or lens may be provided within the main body of the multi-reflecting time-of-flight (MR-ToF) mass analyser, and the ion path length may be changed by controlling the or each additional deflector or lens such that in a first mode of operation the ions complete a first number $K_1$ of oscillation(s) between the ion mirrors in the direction X whilst drifting in the drift direction Y from the ion injector to the detector, and such that in a second mode of operation ions complete a second different (greater) number $K_2$ of oscillations between the ion mirrors in the direction X whilst drifting in the drift direction Y from the ion injector to the detector.

However, in these embodiments, the difference in the path lengths between the first and second modes of operation due to different numbers of oscillations may be relatively small.

Thus, in further embodiments, the ion path length is changed by changing the numbers of passes made through a multi-reflection ToF analyser or through a closed loop multi-reflection ToF analyser. In the first mode of operation, ions may make a first number of pass(es) through the multi-reflection ToF analyser or through the closed loop multi-reflection ToF analyser, and in the second mode of operation, ions may make a second different (greater) number of passes through the multi-reflection ToF analyser or through the closed loop multi-reflection ToF analyser.

For example, in some embodiments, where the analyser is a multi-reflecting time-of-flight (MR-ToF) mass analyser (as described above), the ion path length is changed by changing the numbers of passes made through the analyser using a so-called "zoom" mode of operation, e.g. as originally described in A. Verenchikov , S. Kirillov, Y. Khasin, V. Makarov, M. Yavor and V. Artaev, Journal of Applied Solution Chemistry and Modelling, 2017, 6, 1-22. In these embodiments, the deflector or lens located in proximity with the first end of the ion mirrors may be used to control the number of passes that ions make through the analyser.

Thus, for example, in the first mode of operation, ions may be caused to make a single pass through the analyser (in a "normal" mode), and in the second mode of operation, ions may be caused to make multiple passes through the mass analyser (in a "zoom" mode). Alternatively, in the first mode of operation, ions may be caused to make multiple passes through the analyser (in the zoom mode), and in the second mode of operation, ions may be caused to make a greater number of passes through the mass analyser (in the zoom mode).

In these embodiments, where ions are caused to make a single pass through the mass analyser (in the normal mode), analysing ions may comprise:

injecting ions from the ion injector into the space between the ion mirrors, wherein the ions follow a zigzag ion path having plural oscillations between the ion mirrors in the direction X whilst: (a) drifting from the deflector or lens along the drift direction Y towards the second end of the ion mirrors, (b) reversing drift direction velocity in proximity with the second end of the ion mirrors, and (c) drifting back along the drift direction Y to the deflector or lens; and then causing the ions to travel from the deflector or lens to the detector for detection.

Where ions are caused to make multiple passes through the mass analyser (in the zoom mode), analysing ions may comprise:

(i) injecting ions from the ion injector into the space between the ion mirrors, wherein the ions complete a first pass in which the ions follow a zigzag ion path having plural oscillations between the ion mirrors in the direction X whilst: (a) drifting along the drift direction Y from the deflector or lens towards the second end of the ion mirrors, (b) reversing drift direction velocity in proximity with the second end of the ion mirrors, and (c) drifting back along the drift direction Y to the deflector or lens;

(ii) using the deflector or lens to reverse the drift direction velocity of the ions such that the ions are caused to complete a further pass in which the ions follow a zigzag ion path having plural oscillations between the ion mirrors in the direction X whilst: (a) drifting along the drift direction Y from the deflector or lens towards the second end of the ion mirrors, (b) reversing drift direction velocity in proximity with the second end of the ion mirrors, and (c) drifting back along the drift direction Y to the deflector or lens;

(iii) optionally repeating step (ii) one or more times; and then (iv) causing the ions to travel from the deflector or lens to the detector for detection.

In these embodiments, the difference in the path lengths between the first and second modes of operation can be relatively large, e.g. where the difference in the number of passes is relatively large.

In various further embodiments, the ion path length is changed by switching between a first mode of operation in which the ions complete only a single oscillation (i.e. $K_1=1$) between the ion mirrors in the direction X whilst drifting in the drift direction Y from the ion injector to the detector, and a second mode of operation in which the ions complete plural oscillations (i.e. $K_2>1$) between the ion mirrors in the direction X whilst drifting in the drift direction Y from the ion injector to the detector. This method can provide a particularly large difference between the first and second ion path lengths in a particularly convenient manner.

As described above, in a single oscillation between the ion mirrors in the direction X, ions are reflected once by each of the first and second ion mirrors. Thus, in these embodiments, analysing ions in the first mode of operation comprises: injecting ions from the ion injector into the space between the ion mirrors, wherein the ions are reflected by the first ion mirror, travel to the deflector or lens, and are then caused to travel from the deflector or lens to the detector via a reflection in the second ion mirror.

Correspondingly, in these embodiments, analysing ions in the second mode of operation may comprise: injecting ions from the ion injector into the space between the ion mirrors, wherein the ions follow a zigzag ion path having plural ($K_2>1$) oscillations between the ion mirrors in the direction X whilst: (a) drifting from the deflector or lens along the drift direction Y towards the second end of the ion mirrors, (b) reversing drift direction velocity in proximity with the second end of the ion mirrors, and (c) drifting back along the drift direction Y to the deflector or lens; and then causing the ions to travel from the deflector or lens to the detector for detection.

In these embodiments, the ions may make any plural number of oscillations between the ion mirrors in the second mode of operation, such as $K_2 \geq 5$, $K_2 \geq 10$, $K_2 \geq 20$, $K_2 \geq 30$, etc.

It would also be possible for ions to complete only a single oscillation (i.e. $K_1=1$) between the ion mirrors in the first mode of operation, and for the second mode of operation to utilise the zoom mode (wherein ions make plural passes through the analyser), as described above.

Upon reaching the detector, the ions are detected by the detector, e.g. their arrival time may be recorded by the detector. The time-of-flight and/or mass to charge ratio of the ions may then be determined, optionally combined with time-of-flight and/or mass to charge ratio information of other ions, and e.g. a time-of-flight spectrum or a mass spectrum may be produced. It should be noted that not all of the ions that were injected into the analyser may be detected by the detector, e.g. due to inevitable losses at various points between the injector and the detector and/or detector inefficiencies.

As described above, in the method, first and second sets of data are obtained with the analyser operating in its two different modes of operation. The first set of data can include one or more ion peaks. Similarly, the second set of data can include one or more ion peaks. As described above, the first and second sets of data may be obtained by analysing ions derived from the same sample (e.g. by analysing ions generated from adjacent regions of a sample, and/or by analysing ions generated from a sample at close (adjacent) points in time), e.g. such that ion peaks corresponding to some, most or all (significant) ion peaks in the first set of data appear in the second set of data.

The method may comprise comparing the first set of data to the second set of data so as to identify a first ion peak in the first set of data that corresponds to a second ion peak in the second set of data. The method may comprise identifying plural such pairs of corresponding ions peaks in the first and second sets of data. An ion peak may correspond to another ion peak in that the ions that give rise to those ion peaks may have the same value of m/z (e.g. may be the same species). Identifying a first ion peak in the first set of ion data that corresponds to a second ion peak in the second set of ion data may comprise identifying ions peaks that have values of the m/z within an expected (e.g. small) range. (In embodiments where the ion path length is altered between the first and second modes of operation, corresponding ion peaks will have different times-of-flight which will differ by an amount that depends on the difference between the first and second path lengths.)

The method comprises comparing the intensity of an ion peak in the first set of data to the intensity of a corresponding ion peak in the second set of data, and determining, on the basis of the comparison, a collision cross section (CCS) of the ions associated with the corresponding ion peaks. As used herein, an "intensity" of an ion peak can be any suitable property of an ion peak that is indicative of its intensity, such as for example its height, area, etc.

Comparing the intensity of an ion peak in the first set of data to the intensity of a corresponding ion peak in the second set of data may comprise determining a ratio (an "ion loss ratio") of the intensity of the ion peak in the first set of data to the intensity of the corresponding ion peak in the second set of data. Then, determining the collision cross section (CCS) of the ions associated with the corresponding ion peaks may comprise using the ratio to determine the collision cross section (CCS) of the ions associated with the corresponding ion peaks. This may comprise converting the ratio to a collision cross section (CCS) value using a calibration curve, e.g. where the calibration curve relates measured ion loss ratios to CCS.

The calibration curve may have been determined by analysing calibrant ions (having known collision cross sections) using the first and second modes of operation, determining ratios of the intensity of an ion peak in the first mode of operation to the intensity of a corresponding ion peak in the second mode of operation, and using each ratio together with a known CCS value for calibrant ions associated with each pair of corresponding ion peaks to generate the calibration curve.

It will accordingly be appreciated that further embodiments extend to a method of producing a calibration curve.

Thus, a further aspect provides a method of determining a calibration for a time-of-flight (ToF) mass analyser that is configured to determine the mass to charge ratio (m/z) of ions by determining flight times of ions along an ion path, the method comprising:

- operating the mass analyser in a first mode of operation, and analysing calibrant ions by determining flight times of the calibrant ions along the ion path so as to obtain a first set of data, wherein in the first mode of operation (i) the ion path has a first path length, and (ii) the ion path is maintained at a first pressure;
- operating the mass analyser in a second mode of operation, and analysing calibrant ions by determining flight times of the calibrant ions along the ion path so as to obtain a second set of data, wherein in the second mode of operation (i) the ion path has a second path length, and (ii) the ion path is maintained at a second pressure, wherein the second path length is different to the first path length and/or the second pressure is different to the first pressure;
- determining a plurality of ratios, wherein each ratio is a ratio of the intensity of an ion peak in the first set of data to the intensity of a corresponding ion peak in the second set of data; and
- using each ratio together with a known collision cross section (CCS) value for calibrant ions associated with that ratio to determine a calibration for the time-of-flight (ToF) mass analyser.

This aspect can, and in embodiments does, include any one or more or each of the optional features described herein. Thus, for example, the calibration can be in the form of a calibration curve, e.g. that relates measured ion loss ratios to CCS values. The calibration curve may be used to convert measured ion loss ratios to CCS values (as described above).

As described above, the mass analyser is used to determine CCS value(s) of ions by switching between the first and second modes of operation. These first and second modes of operation may form part of a CCS analysis mode of operation, and the mass analyser may be separately operable in a mass analysis mode of operation. There need not be any difference between these two modes of operation (except that in the CCS mode of operation two scans are necessary). However, in particular embodiments, the pressure at which the ion path is maintained is changed between the mass analysis mode of operation and the CCS analysis mode of operation. In particular, the mass analyser may be maintained at a relatively low pressure in its mass analysis mode of operation, and may be maintained at one or more higher pressure(s) during the CCS analysis mode of operation. Very low pressures of around $5\times10^{-9}$ may be beneficial for the mass analysis mode of operation, while higher pressures of around $5\times10^{-8}$ or $5\times10^{-7}$ may be beneficial for the CCS analysis mode of operation, i.e. so as to ensure that ion losses between the first and second mode of operation are predominantly due to interactions of ions with the background gas and are therefore indicative of CCS values. Other pressures may however be used, e.g. depending on the configuration of the mass analyser.

A further aspect provides a non-transitory computer readable storage medium storing computer software code which when executed on a processor performs the method(s) described above.

A further aspect provides a control system for an analytical instrument such as a mass spectrometer, the control system configured to cause the analytical instrument to perform the method(s) described above.

A further aspect provides an analytical instrument, such as a mass spectrometer, comprising the control system described above.

A further aspect provides an analytical instrument, such as a mass spectrometer, comprising:

- a mass analyser configured to determine the mass to charge ratio (m/z) of ions by determining flight times of ions along an ion path; and
- a control system configured to:
- operate the mass analyser in a first mode of operation, and analyse ions by determining flight times of the ions along the ion path so as to obtain a first set of data, wherein in the first mode of operation (i) the ion path has a first path length, and (ii) the ion path is maintained at a first pressure;

operate the mass analyser in a second mode of operation, and analyse ions by determining flight times of the ions along the ion path so as to obtain a second set of data, wherein in the second mode of operation (i) the ion path has a second path length, and (ii) the ion path is maintained at a second pressure, wherein the second path length is different to the first path length and/or the second pressure is different to the first pressure;

compare the intensity of an ion peak in the first set of data to the intensity of a corresponding ion peak in the second set of data; and determine, on the basis of the comparison, a collision cross section (CCS) of the ions associated with the corresponding ion peaks.

These aspects and embodiments can, and in embodiments do, include any one or more or each of the optional features described herein.

DESCRIPTION OF THE DRAWINGS

Various embodiments will now be described in more detail with reference to the accompanying Figures, in which:

FIGS. 11A-11B show simulated relationships between the natural log of ion transmission and relative collision cross section, measured by varying ion mass: m/z (fixed charge state z) (FIG. 11A) and charge state (fixed m/z) (FIG. 11B)

DETAILED DESCRIPTION

Figure 1:
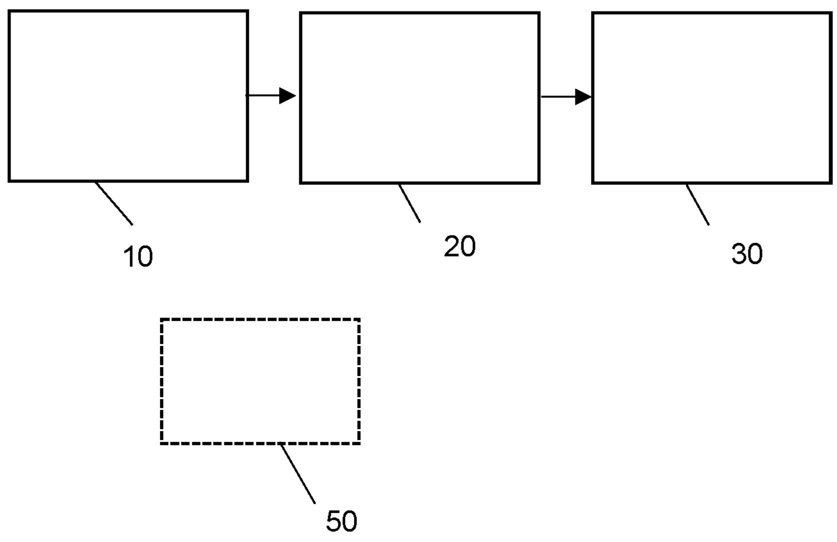
FIG. 1 shows schematically an analytical instrument in accordance with embodiments.

FIG. 1 illustrates schematically an analytical instrument, such as a mass spectrometer, that may be operated in accordance with embodiments. As shown in FIG. 1, the analytical instrument includes an ion source 10, one or more ion transfer stages 20, and a Time-of-Flight (ToF) mass analyser 30.

The ion source 10 is configured to generate ions from a sample. The ion source 10 can be any suitable continuous or pulsed ion source, such as an electrospray ionisation (ESI) ion source, a MALDI ion source, an atmospheric pressure ionisation (API) ion source, a plasma ion source, an electron ionisation ion source, a chemical ionisation ion source, and so on. In some embodiments, more than one ion source may be provided and used. The ions may be any suitable type of ions to be analysed, e.g. small and large organic molecules, biomolecules, DNA, RNA, proteins, peptides, fragments thereof, and the like.

The ion source 10 may optionally be coupled to a separation device such as a liquid chromatography separation device or a capillary electrophoresis separation device (not shown), such that the sample which is ionised in the ion source 10 comes from the separation device.

The ion transfer stage(s) 20 are arranged downstream of the ion source 10 and may include an atmospheric pressure interface and one or more ion guides, lenses and/or other ion optical devices configured such that some or all of the ions generated by the ion source 10 can be transferred from the ion source 10 to the analyser 30. The ion transfer stage(s) 20 may include any suitable number and configuration of ion optical devices, for example optionally including any one or more of: one or more RF and/or multipole ion guides, one or more ion guides for cooling ions, one or more mass selective ion guides, and so on.

The ToF mass analyser 30 is arranged downstream of the ion transfer stage(s) 20 and is configured to receive ions from the ion transfer stage(s) 20. The mass analyser is configured to analyse the ions so as to determine their mass to charge ratio (m/z). To do this, the analyser 30 is configured to pass ions along an ion path within a flight region of the analyser 30, and to measure the time taken (the flight time) for ions to pass along the ion path. Thus, the analyser 30 can comprise an ion detector arranged at the end of the ion path, wherein the analyser is configured to record the time of arrival of ions at the detector.

In its mass analysis mode of operation, the flight region of the analyser 30 may be maintained at high vacuum (e.g. $<1\times10^{-7}$ mbar, $<1\times10^{-8}$ mbar, or $<1\times10^{-9}$ mbar). Ions may be accelerated into the flight region by an electric field, wherein the acceleration may cause ions having a relatively low mass to charge ratio to achieve a relatively high velocity and reach the ion detector prior to ions having a relatively high mass to charge ratio. Ions arrive at the ion detector after a time determined by their velocity and the length of the ion path, which enables the mass to charge ratio of the ions to be determined. Each ion or group of ions arriving at the detector may be sampled by the detector, and the signal from the detector may be digitised. A processor may then determine a value indicative of the time of flight and/or mass-to-charge ratio (m/z) of the ion or group of ions. Data for multiple ions may be collected and combined to generate a time-of-flight spectrum and/or a mass spectrum.

It should be noted that FIG. 1 is merely schematic, and that the analytical instrument can, and in embodiments does, include any number of one or more additional components. For example, in some embodiments, the analytical instrument includes a collision or reaction cell for fragmenting or reacting ions, and the ions analysed by the mass analyser 30 can be fragment or product ions produced by fragmenting or reacting parent ions generated by the ion source 10.

As also shown in FIG. 1, the instrument is under the control of a control unit 50, such as an appropriately programmed computer, which controls the operation of various components of the instrument including the analyser 30. The control unit 50 may also receive and process data from various components including the detector(s) in accordance with embodiments described herein.

The ToF mass analyser 30 can be any suitable type of ToF mass analyser, such as a linear ToF mass analyser, a reflectron ToF mass analyser, a closed-loop multi-reflection mass analyser, or a multi-reflection time-of-flight (MR-ToF) analyser. In general, ToF mass analysers work by extracting a packet of ions into a flight region and measuring the time taken to reach the detector. Commonly, ion mirrors are used to both extend the flight path as well as to provide focusing, so that ions of like mass to charge ratio (m/z) but divergent kinetic energies reach the detector at the same time.

Figure 2:
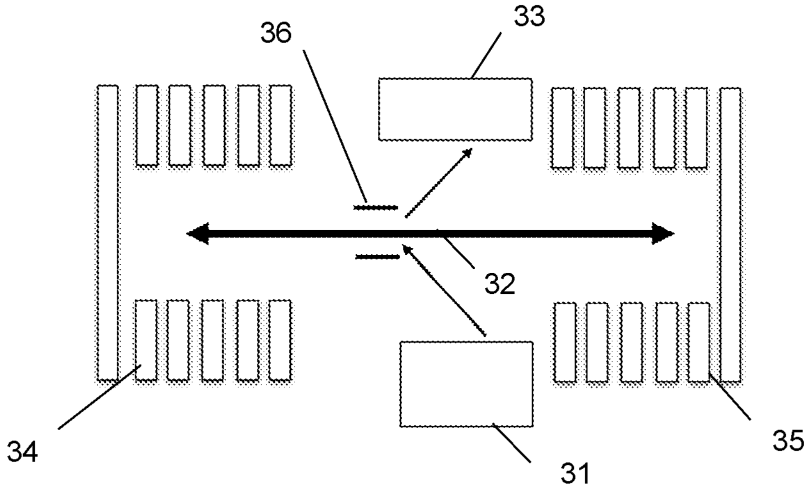
FIG. 2 shows schematically a closed-loop multi-reflection ion trap mass analyser in accordance with embodiments.

FIG. 2 illustrates schematically detail of a closed multi-reflection time of flight mass analyser in accordance with a first exemplary embodiment of the mass analyser 30. As shown in FIG. 2, the mass analyser comprises a pair of ion mirrors 34, 35 that face one another, and that together form an ion trap. The ion mirrors 34, 35 are configured such that ions trapped in the ion trap will oscillate between the ion mirrors 34, 35 on an indefinitely extended (cyclic) ion path 32 until they are released. Ions can be introduced into the ion trap from an ion source (injector) 31 and are eventually detected by an ion detector 33. In the embodiment depicted in FIG. 2, ion admission and extraction into the ion trap is controlled by applying suitable voltage(s) to a deflector 36 arranged in the region between mirrors 34, 35. Alternatively, ion admission and extraction can be achieved by one or both of the ion mirrors 34, 35 being switchable between a trapping mode and a transmissive mode. The ion path length and time spent in the analyser is highly controllable, and not merely a product of the analyser dimensions.

In this type of cyclic analyser, the ion flight time can be many milliseconds long, so the resolution can typically reach >100,000, or even >500,000. However, space charge within the limited volume can degrade the analyser performance due to strong coalescence effects.

Figure 3:
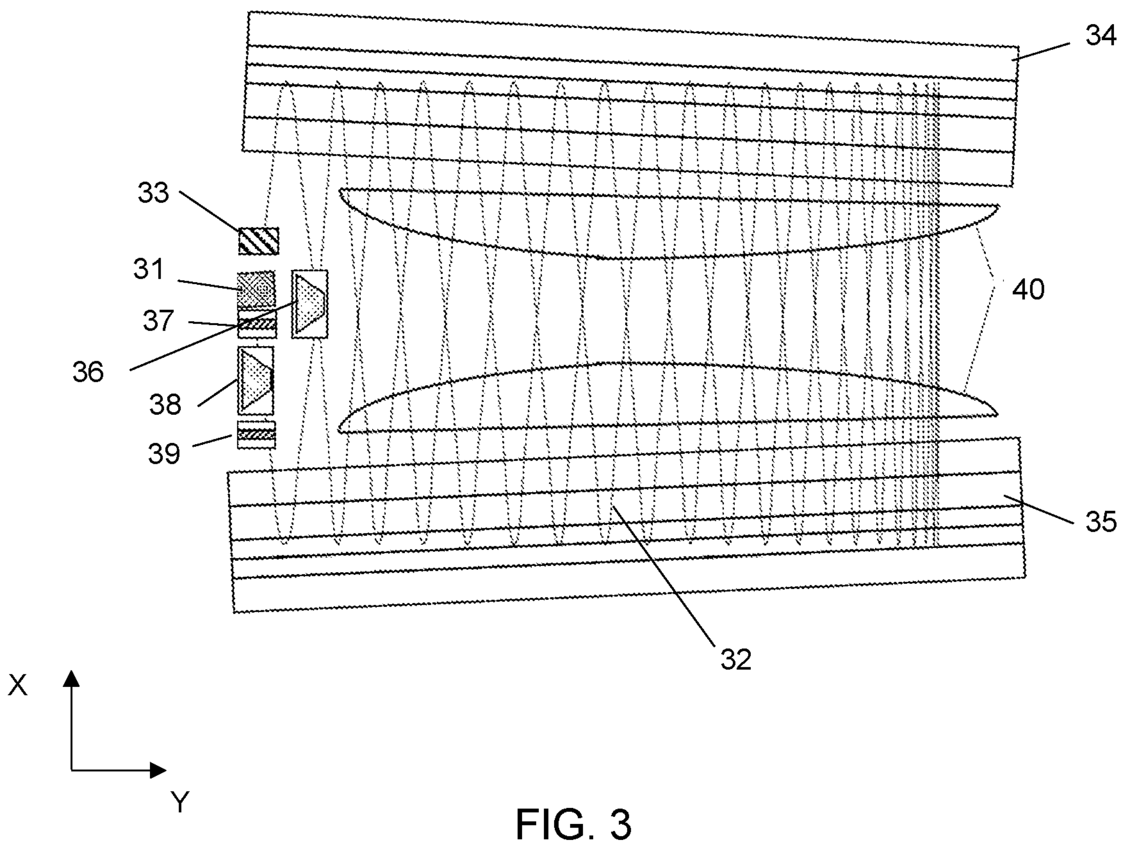
FIG. 3 shows schematically a multi-reflection time-of-flight mass analyser in accordance with embodiments.
Figure 4:
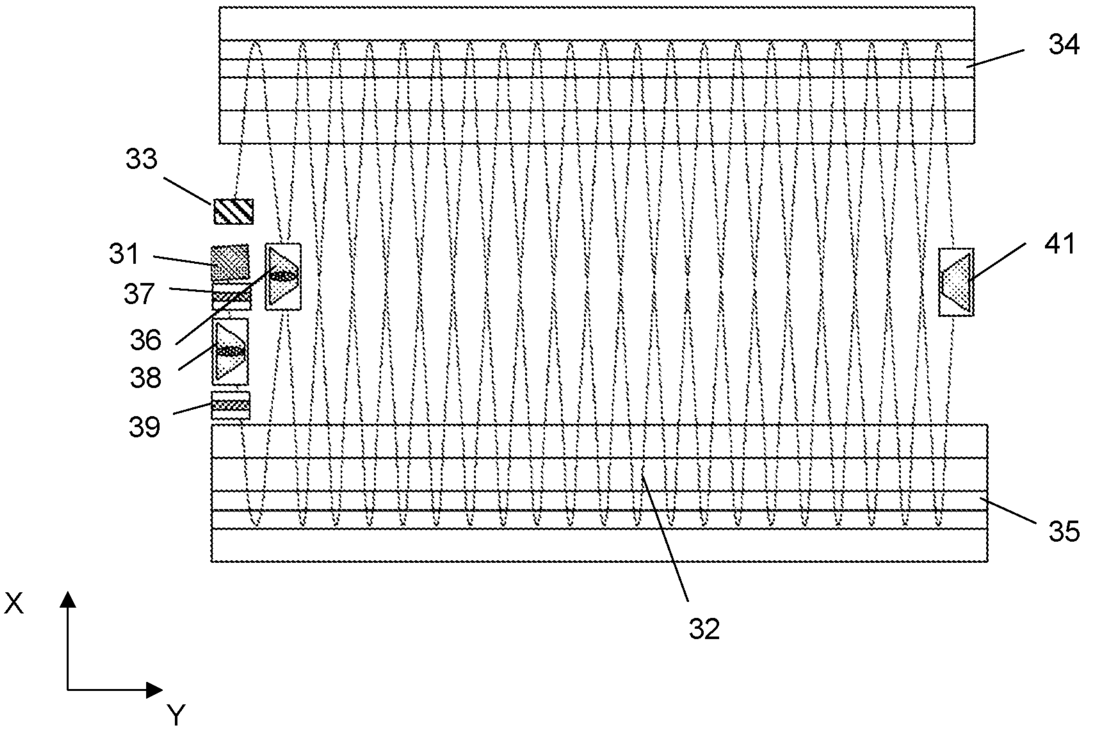
FIG. 4 shows schematically a multi-reflection time-of-flight mass analyser in accordance with embodiments.

FIGS. 3 and 4 illustrate schematically detail of further exemplary embodiments of the analyser 30. In these embodiments, the analyser 30 is a multi-reflecting time-of-flight (MR-ToF) mass analyser.

As shown in FIGS. 3 and 4, the multi-reflection time-of-flight analyser 30 includes a pair of ion mirrors 34, 35 that are spaced apart and face each other in a first direction X. The ion mirrors 34, 35 are elongated along an orthogonal drift direction Y between a first end and a second end.

An ion source (injector) 31, which may be in the form of an ion trap, is arranged at one end (the first end) of the analyser. The ion source 31 may be arranged and configured to receive ions from the ion transfer stage(s) 20. Ions may be accumulated in the ion source 31, before being injected into the space between the ion mirrors 34, 35. As shown in FIGS. 3 and 4, ions may be injected from the ion source 31 with a relatively small injection angle or drift direction velocity, creating a zig-zag ion trajectory, whereby different oscillations between the mirrors 34, 35 are separate in space. Compared to the analyser of FIG. 2, this has the effect of reducing space charge effects within the analyser.

One or more lenses and/or deflectors may be arranged along the ion path, between the ion source 31 and the ion mirror 35 first encountered by the ions. For example, as shown in FIGS. 3 and 4, a first out-of-plane lens 37, an injection deflector 38, and a second out-of-plane lens 39 may be arranged along the ion path, between the ion source 31 and the ion mirror 35 first encountered by the ions. Other arrangements would be possible. In general, the one or more lenses and/or deflectors may be configured to suitably condition, focus and/or deflect the ion beam, i.e. such that it is caused to adopt the desired trajectory through the analyser.

The analyser also includes another deflector 36, which is arranged along the ion path, between the ion mirrors 34, 35. As shown in FIGS. 3 and 4, the deflector 36 may be arranged approximately equidistant between the ion mirrors 34, 35, along the ion path after its first ion mirror reflection (in ion mirror 35), and before its second ion mirror reflection (in the other ion mirror 34).

The analyser also includes a detector 33. The detector 33 may be any suitable ion detector configured to detect ions, and e.g. to record an intensity and time of arrival associated with the arrival of ion(s) at the detector. Suitable detectors include, for example, one or more conversion dynodes, optionally followed by one or more electron multipliers, and the like. In its "normal" mass analysis mode of operation, ions are injected from the ion source 31 into the space between the ion mirrors 34, 35, in such a way that the ions adopt a zigzag ion path having plural oscillations between the ion mirrors 34, 35 in the X direction, whilst: (a) drifting along the drift direction Y from the deflector 36 towards the opposite (second) end of the ion mirrors 34, 35, (b) reversing drift direction velocity in proximity with the second end of the ion mirrors 34, 35, and then (c) drifting back along the drift direction Y to the deflector 36. The ions can then be caused to travel from the deflector 36 to the detector 33 for detection.

In the analyser of FIG. 3, the ions mirrors 34, 35 are both tilted with respect to the X and/or drift Y direction. It would instead be possible for only one of the ion mirrors 34, 35 to be tilted, and e.g. for the other one of the ion mirrors 34, 35 to be arranged parallel to the drift Y direction. In general, the ion mirrors are a non-constant distance from each other in the X direction along their lengths in the drift direction Y. The drift direction velocity of ions towards the second end of the ion mirrors is opposed by an electric field resulting from the non-constant distance of the two mirrors from each other, and this electric field causes the ions to reverse their drift direction velocity in proximity with the second end of the ion mirrors and drift back along the drift direction towards the deflector.

The analyser depicted in FIG. 3, further comprises a pair of correcting stripe electrodes 40. Ions travelling down the drift length are slightly deflected with each pass through the mirrors 34, 35 and the additional stripe electrodes 40 are used to correct for the time-of-flight error created by the varying distance between the mirrors. For example, the stripe electrodes 40 may be electrically biased such that the period of ion oscillation between the mirrors is substantially constant along the whole of the drift length (despite the non-constant distance between the two mirrors from). The ions eventually find themselves reflected back down the drift space and focused at the detector 33.

Further detail of the tilted-mirror type multi-reflection time-of-flight mass analyser of FIG. 3 is given in U.S. Pat. No. 9,136,101, the contents of which are incorporated herein by reference.

In the analyser of FIG. 4, the ion mirrors 34, 35 are parallel to each other. In this embodiment, in order to cause the ions to reverse their drift direction velocity in proximity with the second end of the ion mirrors and drift back along the drift direction towards the deflector, the analyser includes a second deflector 41 at the second end of the ion mirrors 34, 35.

As also shown in FIG. 4, in this embodiment, a lens can be included in the injection deflector 38 and/or in the deflector 36. Thus, the ion beam is allowed to expand a short way into the analyser before meeting a long-focus lens, which has the effect of focussing the ion beam along its length. The lens may be an elliptical drift focusing (converging) lens mounted within the deflector 36. The second deflector 41, which may also include a lens, is used to reverse the beam direction whilst maintaining control of focal properties.

Further detail of the single-lens type multi-reflection time-of-flight mass analyser of FIG. 4 is given in UK Patent No. GB 2,580,089, the contents of which are incorporated herein by reference.

In the analysers depicted in FIGS. 3 and 4, the ion beam is allowed to spread out relatively broadly (in the drift direction Y) for most of its flight path. This is in contrast, for example, with multi-reflecting time-of-flight (MR-ToF) mass analysers which use a set of periodic lenses to focus the ion beam along its entire flight path, e.g. as described in the article A. Verenchikov, et al., Journal of Applied Solution Chemistry and Modelling, 2017, 6, 1-22. A significant advantage of allowing the ion beam to spread out broadly for most of its flight path is that space charge effects are reduced, which can be a significant problem for time-of-flight analysers. Nevertheless, embodiments described herein are also applicable to other MR-ToF analyser designs, such as the Verenchikov-type MR-ToF analyser.

In the embodiments depicted in FIGS. 3 and 4, the fact that the ion beam is relatively broad in the drift dimension Y means that the deflector 36 should be able to accept such a wide beam without introducing clipping or uneven deflection. A suitable deflector design is a trapezoid shaped or prism-like deflector. Thus, the deflector 36 may comprises a trapezoid shaped or prism-like electrode arranged above the ion beam and another trapezoid shaped or prism-like electrode arranged below the ion beam. The electrodes may be angled with respect to the ion beam. Ions may experience a relatively strong electric field at the edges of the angled electrodes, inducing a deflection. The electrodes may be located out-of-plane of the deflection, thereby allowing them to be easily made to be broad enough to accept a wide ion beam (at least compared to more conventional deflection plates that would sit at either side of the beam).

Figure 5:
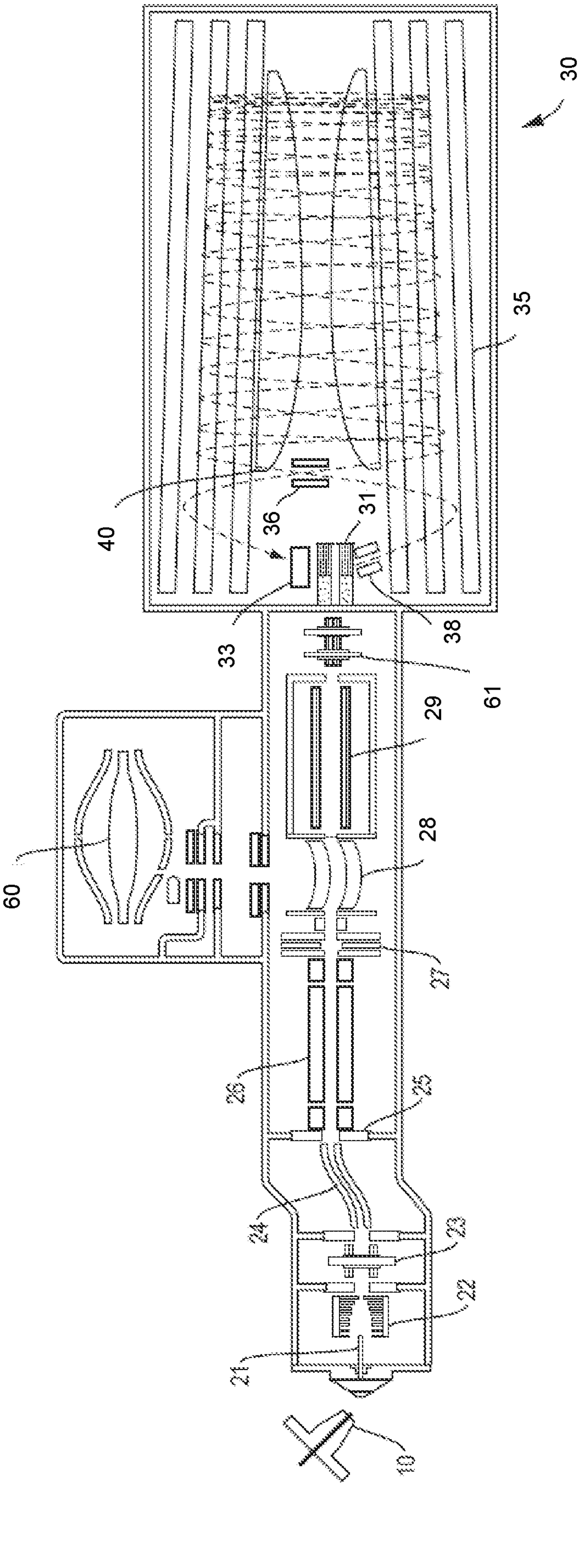
FIG. 5 shows schematically an analytical instrument in accordance with embodiments.

FIG. 5 shows in detail an example mass spectrometer including an MR-ToF mass analyser that may be operated in accordance with embodiments. It will be understood that the instrument shown in FIG. 5 is a non-limiting example, and that numerous variations are possible.

In the embodiment depicted in FIG. 5, the instrument's ion source 10 is an electrospray ionisation (ESI) ion source. The instrument includes a vacuum interface, which includes a transfer tube 21, an ion funnel 22, a quadrupole pre-filter ion guide 23, and a "bent flatapole" ion guide 24. The bent flatapole ion guide 24 may be of the design described in U.S. Pat. No. 9,536,722.

The instrument also includes a mass filter in the form of a quadrupole mass filter 26, an ion trap 28 in the form of a curved linear ion trap ("C-Trap"), and a collision cell 29 in the form of an ion routing multipole collision cell ("IRM"). Ions from the ion source 10 can be accumulated in the C-Trap 28 and/or collision cell 29 by opening and closing a gating electrode located in a charge detector assembly 27, which is arranged between the C-Trap 28 and the mass filter 26.

The instrument also includes a mass analyser 60 in the form of an orbital ion trap mass analyser. Once accumulated in the ion trap 28 and/or collision cell 29, ions can be ejected into the mass analyser 60. To do this, the ions may be ejected from the trap 28 in a direction orthogonal to the axis of the trap (orthogonal ejection), for example by applying one or more suitable DC voltages to the ion trap 28.

The collision or reaction cell 29 is arranged downstream of the ion trap 28. Ions collected in the ion trap 28 can either be ejected orthogonally to the mass analyser 60 without entering the collision or reaction cell 29, or the ions can be transmitted axially to the collision or reaction cell 29 for processing before returning the processed ions to the ion trap 28 for subsequent orthogonal ejection to the mass analyser 60. The processing may comprise, for example, fragmenting the ions by collisions with a collision gas and/or a reagent in the collision cell 29, or further cooling the ions by collisions with a gas at lower energies that do cause the ions to fragment.

The instrument also includes a time-of-flight (ToF) mass analyser 30 in the form of a multi-reflection time-of-flight (ToF) mass analyser, which has been added to the rear of the instrument. This hybridized instrument is described in more detail in U.S. Pat. No. 10,699,888. In the instrument depicted in FIG. 5, the analyser is of the tilted-mirror type of FIG. 3 (and as described in U.S. Pat. No. 9,136, 101), but it will be understood that any type of ToF analyser could be used.

As shown in FIG. 5, the instrument includes a multipole ion guide 61 to allow ions to be transferred from the collision cell 29 to the time-of-flight mass analyser 30. Ions are delivered from the collision cell 29 to the extraction trap 31 of the mass analyser 30 via the multipole ion guide 61. The ions are accumulated and cooled in the extraction trap 31.

The extraction trap 31 may incorporate two trapping regions, one at a relatively higher pressure for rapid ion cooling, and a second low pressure region for ion extraction. Ions are cooled in the high-pressure region and then transferred to the low-pressure region, where they are pulse ejected into the ToF analyser via the pair of deflectors 36, 38. Ions oscillate between the pair of mirrors 34, 35, which are tilted relative to one another so that the ion path is slowly deflected and redirected back to the detector 33. Correcting stripe electrodes 40 counter the loss of ion focus otherwise induced by the non-parallelism of the mirrors.

Although the MR-ToF mass analyser of FIGS. 3, 4 and 5 is particularly beneficial, the ToF analyser 30 can in general by any type of ToF mass analyser, including for example a linear ToF mass analyser, an orthogonal acceleration ToF mass analyser, a reflectron ToF mass analyser, etc. Various other types of ToF mass analyser are possible. For example, an MR-ToF of the form show in FIG. 4 could have its detector located at the end of the ion mirrors 34, 35 opposite the injector 31.

Mass spectrometry has proven to be extremely powerful in determining analyte molecular structures, but is often insufficient to provide further information on an analyte's conformation, such as for example a protein's quaternary structure. Such work often relies upon complementary data from other techniques, such as microscopy, crystallography, and ion mobility spectrometry.

This latter technique has many variations, but in its most common form-drift tube ion mobility—measures the drift time of ions under a uniform electric field through a buffer gas. The ions experience a drag force caused by collisions with the buffer gas, the extent of which is dependent on the ions' collision cross section CCS (in effect, the area around the centre of the ion in which the centre of the gas molecule must be to trigger a collision), which is related to the size of the ion and consequently the rate of collisions it experiences with the buffer gas.

Numerous hybrid ion-mobility separator-mass spectrometer instruments exist, which are all relatively complex and expensive instruments. That is, most existing instruments capable of determining both m/z and CCS of ions require additional dedicated hardware (i.e. a separate ion mobility separator), which may not be feasible for lower cost and/or single analyser instruments.

An alternative method for CCS determination has been described via measurement of signal decay within Fourier Transform analysers such as an Orbitrap™ mass analysers ((Sanders et al., Analytical Chemistry, 2018, 90, (9), 5896-5902). Ions oscillate within the Orbitrap™ mass analyser, generating signal that is transformed to produce a mass spectrum. Over time ions may experience collisions with background gas and may be effectively knocked out of the trap or at least shifted out of phase, producing a decay over time of the ion signal that relates to the collision probability, and thus to collision cross section. Although the Orbitrap™ mass analyser CCS measurement technique is very promising, it can be relatively complex due to space charge effects and related complexities of Orbitrap™ mass analyser detection.

Embodiments described herein provide an alternative method for measuring ion mobility (i.e. CCS) that uses a ToF mass analyser. Existing ToF mass analysers have no ability to measure collision cross sections.

It has been recognised that transmission losses in a long ion path mode (such as a multi-oscillation mode or a zoom mode) versus a short ion path mode (such as a single oscillation mode) are caused by collisions with background gas. Ions impact gas molecules and are either lost from the system or arrive with a time-of-flight distinct from other ions of like m/z. As the probability of collision is influenced by the collision cross-section, the transmission difference across a change in ion path length (or pressure) is also so-influenced, and therefore collision cross section may be measured by varying path length (or pressure) and measuring the ion losses across it.

The number of ions $N_d$ registered by the detector 33 can be approximated as:

$$N_d = N_i \times (1 - \eta_c) \times \alpha \times \exp\left(-\sigma \frac{L \times p}{k_B T}\right),$$

where $N_i$ is the number of ions in the initial bunch, $\eta_c$ is the fraction of ions clipped by parts of analyser e.g. diaphragm(s), $\alpha$ is the detection efficiency, $\sigma$ is the collisional cross-section, L is the length of the ion travelling path 32, p is the pressure of gas in the ion path 32, and T is the gas temperature. This model takes account only of collisions which remove an ion from the detectable bunch by either fragmentation of an ion or its deflection to a trajectory which doesn't reach the detector 33. Hence, the cross-section $\sigma$ is understood as the partial cross-section related to such an outcome.

An independent assessment of $N_i$, $\eta_c$ and $\alpha$ is usually unavailable, as only the number of detected ions is routinely measured. Nevertheless, the collisional cross-section $\sigma$ may be estimated as a slope of ln $N_d$ versus the product L×p:

$$\sigma = -k_b T \frac{d \ln N_d}{d(L \times p)}.$$

To this end, in the method, two or more measurements of $N_d$ are performed with different values of the product L×p. These measurements may be done in a single set of experimental runs with the same input flux of ions and possibly unchanged values of $N_i$, $\eta_c$, and $\alpha$.

A first embodiment of the method involves varying the pressure inside the vacuum chamber in which the analyser is arranged, e.g. by means of gas injection or altering the vacuum pumping speed. It has been found that control of turbopump speed is a particularly suitable way to control the pressure. These approaches, can however, have drawbacks: (i) pressure measurements are in general not highly accurate; (ii) variation of gas injection or pumping speed may provide a poorly controllable pressure gradient in the vacuum chamber; (iii) a pressure variation has inertia and so does not allow high repetition rates; and (iv) its implementation requires moving mechanical parts.

The ToF analysers described above, however, offer the opportunity to alter the product L×p by changing the effective travelling path L, for example by changing the number of ion oscillations between the mirrors 34, 35. Using this method, the pressure may be unaltered.

In this method, the signal of detected ions $N_d$ is measured two or more times with different numbers of ion oscillations K. As described further below, switching between different numbers of oscillations can be performed electrically by changing the prism 36 and/or the stripe 40 voltages. A linear regression may be constructed as: ln $N_d$ (K)≅−AK+B, where the coefficients A and B can be assessed by any suitable known numerical technique, such as the least squares method.

The sought cross-section is then found as:

$$\sigma = \frac{k_b T}{L_0 p} \times A,$$

where $L_0$ is the effective path length per oscillation.

In the case that the pressure p or $L_0$ is unknown, the multiplier $k_b T/L_0 p$ may be assessed with the use of a calibration ion species with a known cross-section $\sigma^*$ and a measured slope A*. The collisional cross-section is then determined by proportionality $\sigma=\sigma^*\times A/A^*$ .

In these embodiments, the length of the ion path can be adjusted in any suitable manner, depending on the configuration of the ToF analyser 30.

In general, the method can be carried out on any instrument incorporating a ToF analyser capable of altering the ion flight path length, e.g. by altering the number of reflections taken by ions through the analyser. For example, this could be from zero (linear ToF) reflections to a single reflection. This could also involve a switch between a low sensitivity W-shaped ion flight path and a high sensitivity low-resolution V-shaped ion flight path.

Where the ToF analyser 30 is a closed-loop MR-ToF mass analyser of the type depicted in FIG. 2, the length of the ion path may be manipulated by controlling the number of oscillations between the ion mirrors 34, 35.

Where the ToF analyser 30 is an MR-ToF mass analyser e.g. of the types depicted in FIGS. 3-5, the length of the ion path may be manipulated by adjusting the angle at which ions are injected into the mirror system, so that the ions undergo more or fewer oscillations before they reach the detector 33 (even if the optimum resolution or focal properties are sacrificed when doing so).

One particularly suitable mode of operation for such analysers is where the deflector 36 that sets the injection angle is set to a very strong retarding potential, which directs the ion beam backwards into the detector 33 without ever entering the main volume of the mass analyser. This may be termed a "single-oscillation mode" as ions only pass through each mirror once.

Figure 6A:
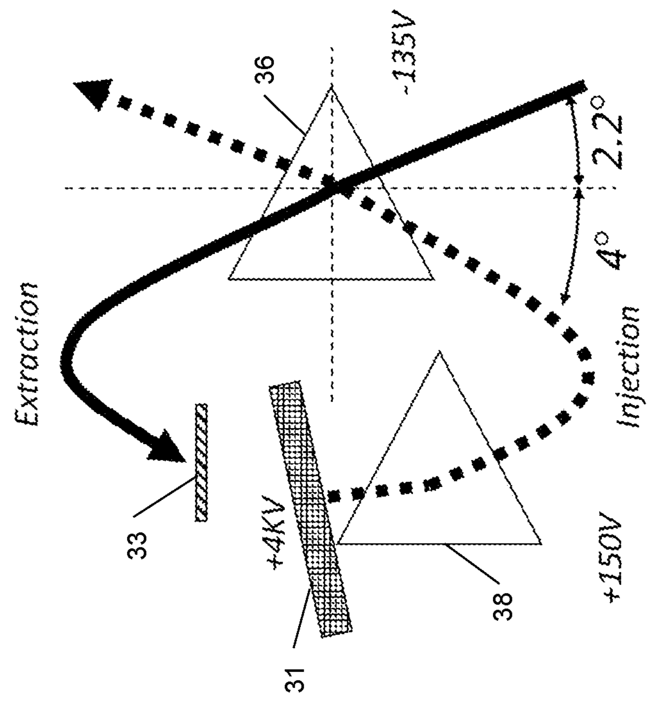
FIG. 6A illustrates schematically a multi-oscillation mode of operation of a multi-reflection time-of-flight mass analyser.
Figure 6B:
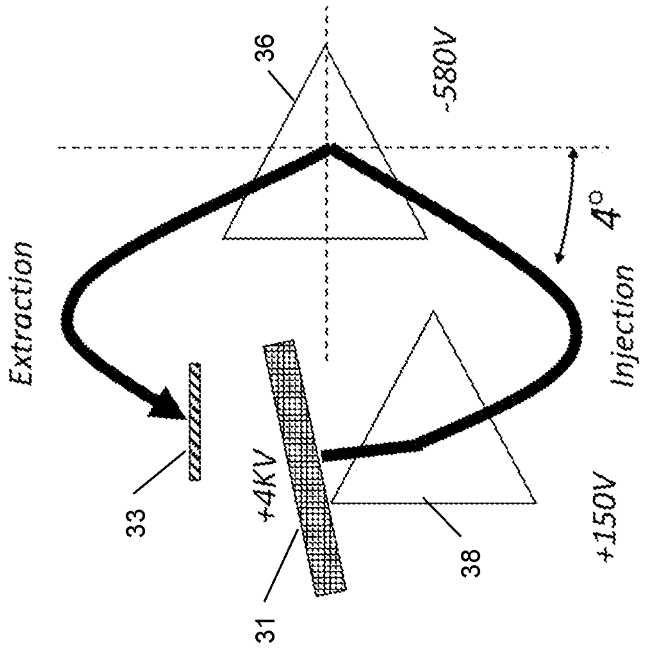
FIG. 6B illustrates schematically a single-oscillation mode of operation of a multi-reflection time-of-flight mass analyser.

This is illustrated by FIG. 6. More particularly, FIG. 6A illustrates the "normal" multi-oscillation mode of operation (as described above), while FIG. 6B illustrates the single-oscillation mode of operation.

As shown in FIG. 6A, in the multi-oscillation mode of operation, ions are ejected from the extraction trap 31 with a high voltage extraction pulse around +4 kV, and the resulting ion beam is deflected by the injection deflector 38 (which has a voltage of around +150V applied to it) and the deflector 36 (which has a voltage of around −135V applied to it) so that the beam adopts the zig-zag trajectory through the analyser as described above, and eventually arrive back at the detector 33.

As shown in FIG. 6B, in the single-oscillation mode of operation, ions are again ejected from the extraction trap 31 with a high voltage extraction pulse around +4 kV, and the resulting ion beam is deflected by the injection deflector 38 (which has a voltage of around +150V applied to it) and the deflector 36 (which has a voltage greater negative voltage, e.g. of around −580V, applied to it) so that the beam is sent immediately to the detector 33.

In the multi-oscillation mode of operation, the ion beam will typically make around 20 to 25 pairs of reflections in the ion mirrors 34, 35, while in the single-oscillation mode of operation the ion beam effectively makes only a single pair of reflections in the ion mirrors 34, 35. Switching between the modes is performed electrically by changing the prism 36 voltage (optionally together with the stripe 40 voltage). Thus, in this way, a large path length difference (e.g. of between 20 and 25 times) can be produced in a particularly convenient manner.

Figure 7:
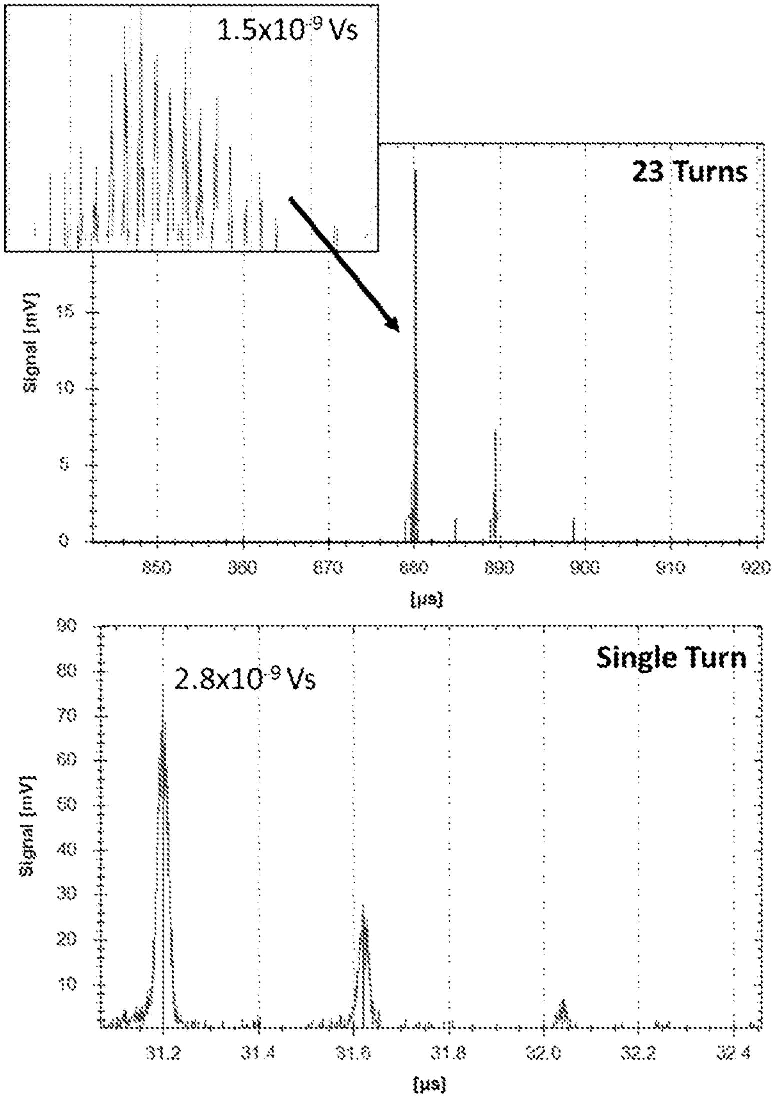
FIG. 7 shows raw time-of-flight spectra showing Myoglobin envelopes (isolated +20, with charge state reduction to +19 and +18) using the multi and single-oscillation modes.

FIG. 7 shows raw time-of-flight spectra of myoglobin (isolated +20, with charge state reduction to +19 and +18) obtained using a prototype mass spectrometer of the type depicted in FIG. 4 operating in the multi and single-oscillation modes. It can be seen that 50% of myoglobin 20+ ions (17.5 KDa mass) were lost when using a 23-oscillation path versus a single oscillation.

Another method to vary the path length, originally described in A. Verenchikov , S. Kirillov, Y. Khasin, V. Makarov, M. Yavor and V. Artaev, Journal of Applied Solution Chemistry and Modelling, 2017, 6, 1-22, is by using a so-called zoom mode of operation. This method can be applied to the MR-ToF of the types depicted in FIGS. 2 to 5, by altering the deflector 36 voltage at the entrance/exit of the analyser to switch from an open mode to a closed trapping mode, thereby extending the flight path over several drift passes until ions are released to the detector 33. The length of the ion path may be manipulated by controlling the number of passes in the zoom mode.

Thus, in embodiments, the multi-reflecting time-of-flight (MR-ToF) mass analyser is operated in a multi-pass "zoom" mode of operation. Ions are made to make multiple passes within the analyser in the drift direction Y. Increasing the number N of passes increases the length of the ion path that ions take within the analyser (between the injector and the detector). In the Verenchikov analyser, this may be done by controlling a deflection voltage applied to an entrance lens. For the analysers depicted in FIGS. 3 and 4, the deflector 36 at the front of the analyser, which is normally used to reduce the injection angle and/or optimise the number (K) of oscillations within a single drift pass, may (also) be used to reverse the drift direction velocity of the ions such that the ions are caused to complete a further pass through the analyser.

Thus, in a multi-pass zoom mode of operation, ions are caused to complete plural (N) passes within the analyser, where in each pass the ions drift in the drift direction Y from the deflector 36 (or entrance lens) towards the opposite (second) end of the ion mirrors 34, 35, and then back to the deflector 36 (or entrance lens). In each pass, the ions also complete plural (K) oscillations between the ion mirrors in the X direction. Thus, in each pass, the ions adopt a zigzag ion path through the space between the ion mirrors 34, 35.

In the analysers depicted in FIGS. 3 and 4, an initial pass may be initiated by injecting the ions from the injector 31 into the space between the ion mirrors 34, 35. The ions may be reflected in one of the ion mirrors 35 and may then travel to the deflector 36. No voltage may be applied to the deflector 36 (or else an appropriate (e.g. relatively small) voltage may be applied to the deflector) such that the ions are caused to exit the deflector 36 in a direction towards the second end of the ion mirrors. Upon exiting the deflector 36, the ions adopt a zigzag ion path 32 having plural (K) oscillations between the ion mirrors 34, 35 in the direction X whilst: (a) drifting along the drift direction Y from the deflector 36 towards the second end of the ion mirrors, (b) reversing drift direction velocity in proximity with the second end of the ion mirrors, and (c) drifting back along the drift direction Y to the deflector 36.

After the ions have completed this initial pass, each further pass is initiated by using the deflector 36 to reverse the drift direction velocity of the ions (in proximity with the first end of the ion mirrors). To do this, an appropriate voltage may be applied to the deflector 36 that causes ions to leave the deflector 36 with a drift direction velocity opposite to the drift direction velocity with which the ions originally entered the deflector 36.

After the ions have completed the desired (plural) number (N) of passes within the analyser, the ions are allowed to travel from the deflector 36 to the detector 33 for detection. To do this, the voltage may be removed from the deflector 36 (or else an appropriate voltage may be applied to the deflector) such that the ions are caused to exit the deflector 36 in a direction towards the detector 33. The ions may be reflected in (the other) one of the ion mirrors 34 before travelling to (and being detected by) the detector 33.

Another method to vary the path length of ions would be to provide one or more additional deflectors within the main body of the analyser, e.g. between the first deflector 36 and the second deflector 41 in the analyser depicted in FIG. 4, and to use the one or more additional deflectors to controllably extend the path length of ions travelling through the analyser.

These various methods of altering the path length can be combined. For example, the single-oscillation mode of operation can be used together with the zoom mode of operation to obtain two sets of mass spectral data with even greater path length differences.

As an example, consider the multi-reflection analyser of FIG. 3, where ions perform a number K of oscillations between the two opposing mirrors 34, 35. The number K may be either one (the single-oscillation mode) or lie in the range 20 to 30 (in the multi-oscillation mode), depending on the voltage applied to the deflector 36 as illustrated in FIG. 6.

Let the ion path on a single oscillation comprise approximately one meter $l_0=1$ m. Accordingly, K oscillations incorporate the total path of $Kl_0$. Assume that the pressure in the vacuum chamber equals $p=10^{-7}$ mbar. A single high-energy collision most likely causes the ion's fragmentation. A fragment either does not reach the detector 33 or arrives at the detector 33 in a substantially different time; in both outcomes the corresponding signal is missing from the detected peak.

Figure 8A:
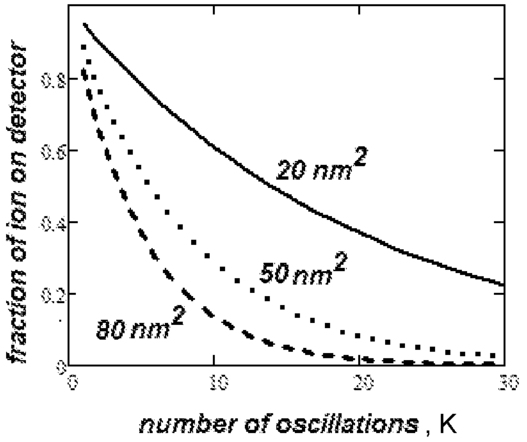
FIG. 8A shows a calculated fraction of ions surviving N oscillations between opposing mirrors without a collision with a buffer gas molecule.
Figure 8B:
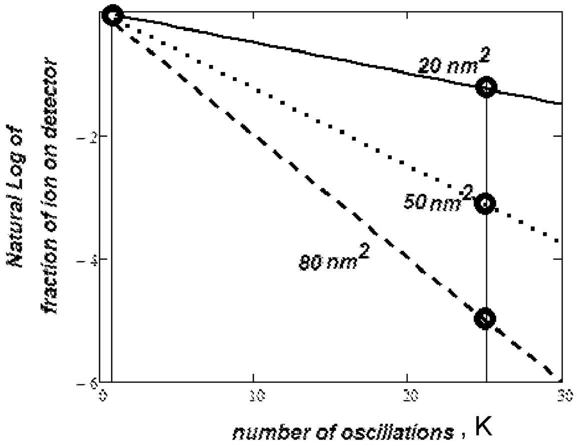
FIG. 8B shows the data of FIG. 8A using a logarithmic scale.

FIG. 8A shows the modelled fraction of ions which reach the detector 33 without a collision $\eta(n)=\exp(-Kl_0\sigma p/k_bT)$, assuming that the ion has the collisional cross-section 20, 50, or 80 $nm^2$. That is, FIG. 8A shows the fraction of ions that survives K oscillations between opposing mirrors 34, 35 without a collision with a buffer gas molecule. FIG. 8B shows these data in the logarithmic scale.

The slope of the logarithm of the ion number versus the number of oscillations is directly proportional to the collisional cross-section, and the latter is unambiguously determined from the slope. Normally, the slope is assessed having two points: K=1 (single-oscillation mode) and K=25 (normal multi-oscillation mode). So, if the amount of the signal drop $\eta(25)/\eta(1)$ is observed after switching from the single-oscillation mode to the normal mode, the collisional cross-section is determined with the formula:

$$\sigma = -\frac{k_b T}{p l_0}\frac{1}{25-1}\ln\frac{\eta(25)}{\eta(1)}.$$

It has been found that the method is most sensitive and immune to measurement errors in the case that the signal drop constitutes between about 20% and 80%.

Figure 9:
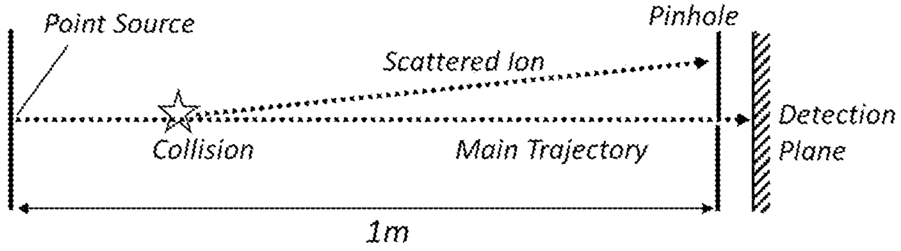
FIG. 9 illustrates a flight tube model used in a simulation.

A simplified simulation was constructed in the MASIM3D suite to measure transmission losses through a 1 m flight tube. As illustrated in FIG. 9, ions with various m/z or charge state were generated with 10 keV energy at a point source. A diaphragm with a 10 μm pinhole was set up after 1 metre, so that scattered ions would be effectively blocked, and the proportion of ions that passed through the pinhole to the detection plane measured. The flight tube was filled with nitrogen ($N_2$) at $5\times10^{-6}$ mbar pressure, which was found suitable for the range of ion m/z and charge states studied (typically a mass of 1000-15,000, and charge state range of 1-15+).

Figure 10:
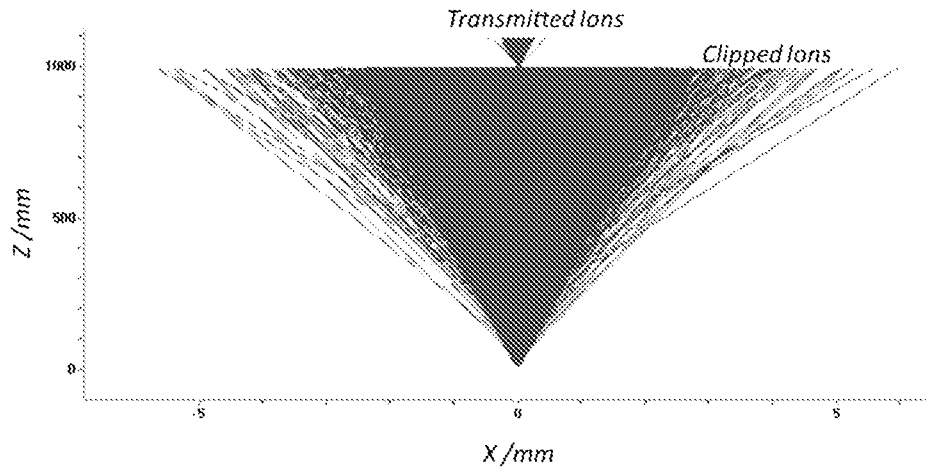
FIG. 10 shows a visualization of ion scatter during the passage of 10 KeV ions with m/z=1000 and z=10+ through a 1 metre flight path filled with $5\times10^{-6}$ mbar $N_2$.

FIG. 10 shows the trajectories of 10,000 ions, of which 76% were scattered and lost. In this simulation there was no need for a relative transmission measurement, as the number of ions to begin with was predetermined. Notably MASIM sets collision cross sections based on ion mass, proportional to $mass^{2/3}$, so this relative behaviour is easy to check.

FIGS. 11A-11B shows the trends of the natural log of ion transmission, against relative collision cross section, which was varied by scanning charge state at fixed m/z, or by scanning m/z. The trends are linear and reproducible, at least if ion numbers are substantial, around 10,000 per analyte, though 1,000 per analyte may also give reasonable results. Interestingly, differences in ion velocity between the trend for charge state and the trend for m/z seem not to have made a great difference to the outcome.

Figure 12:
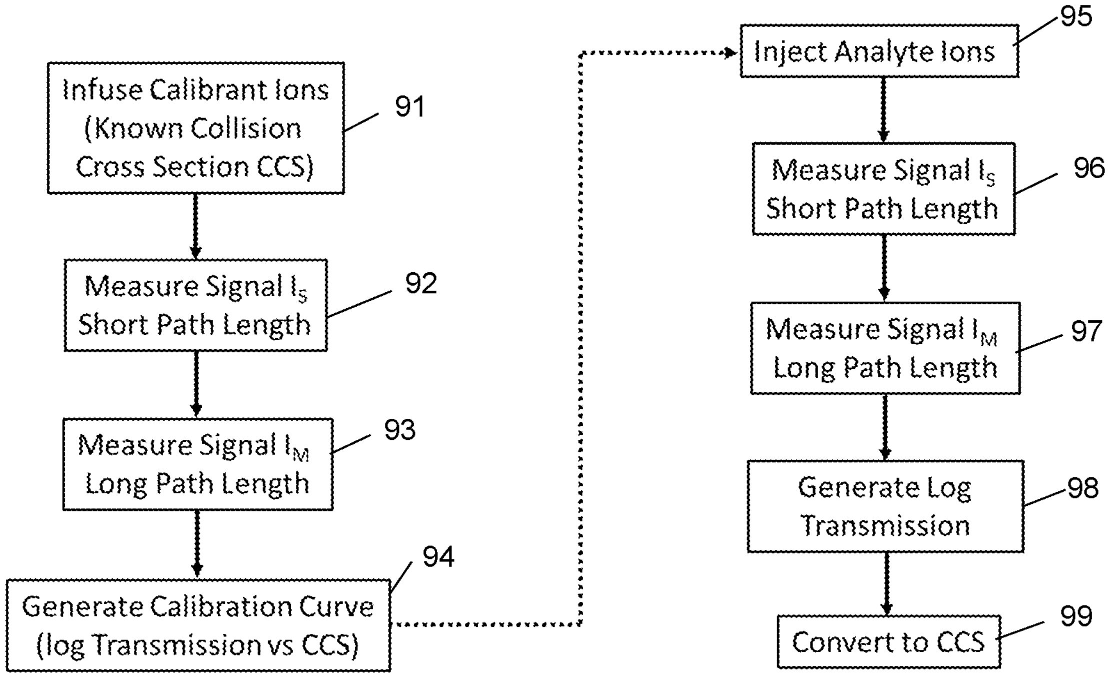
FIG. 12 is a flowchart showing a calibration workflow and an experimental collision cross section measurement workflow.

FIG. 12 shows a flowchart of a suitable experimental workflows for calibration and collision cross section measurement.

For external calibration, a calibration curve is first produced from a known sample. Thus, calibrant ions having various known CCS values are infused into the mass analyser (step 91), and these ions are mass analysed once with the mass analyser configured in its short ion path mode (step 92) and once with the mass analyser configured in its long ion path mode (step 93). The resulting ion loss rates for ions having a known CCS value are determined, and used to build a calibration curve (step 94). The curve of ion loss rate to ln(CCS) should be a linear fit, although there may be some peculiarities which may be correctable. For example, a correction may be made in respect of the regime where collisional losses are low (low mass ions, low pressure), and where other non-collisional loss mechanisms come to dominate. This may be achieved, for example, by comparing m/z related transmission against a single turn of very low mass/low CCS calibrant ions, or by making a similar test at extremely reduced pressure.

Then when analysing an analyte, the analyte ions are injected into the mass analyser (step 95), and these ions are mass analysed once with the mass analyser configured in its short ion path mode (step 96) and once with the mass analyser configured in its long ion path mode (step 97). The resulting ion loss rates for ions of interest are measured (step 98) and are converted directly to CCS values (step 99) using the calibration curve.

It will be appreciated from the above that embodiments provided the use of a shortened (or lengthened) ion flight path or altered pressure to determine path length dependent ion losses, and by comparison with a calibration (from known calibrant ions) to further determine collision cross sections.

The method measures collision cross sections using a time-of-flight mass analyser. Thus, the technique can provide increasingly important and valuable information about analyte structural properties, without recourse to additional bulky/expensive hardware.

The CCS measurement via variable flight path can be performed using any type of time-of-flight analyser or multi-reflection time-of-flight analyser, so long as the resolution is high enough that collisionally scattered ions are removed from the resolved peak.

In embodiments, the level of vacuum in the ToF chamber should be switchable between the ultra-high ($5\times10^{-9}$ mbar) needed for the mass-spectrometry mode and a higher pressure (in the range of $5\times10^{-8}$-$5\times10^{-7}$ mbar) required for the collisional cross-section determination.

Although various particular embodiments have been described above, various alternatives are possible.

For example, an alternative possibility for altering the path length within a linear or single-reflection time-of-flight analyser is to divert the ion beam to a second detector located closer to the ion source (such as near the first time-focus) for the short path measurement, and to then switch back to the main path.

Other voltages such as mirror or extraction voltages may be adjusted to ensure ions are time-focused in both flight paths.

Multiple different flight paths may be used rather than just two, which may help to identify and correct for unwanted non-linearities in the trend.

As described above, it is also possible to perform a similar measurement by varying pressure rather than path length, or alternatively both pressure and path length variation may be employed. A system using pressure changes to measure CCS may incorporate a gas feed to the analyser directly, so that ion trapping and extraction is not altered. Even at fixed pressure this may be useful, as system pressure should be set to a level that removes a reasonable proportion of analyte ions in flight, for reasonable ion statistics. Generally, it is easier to modify gas pressure over a wide range than it is to modify the flight path length, as methods like the zoom mode often involve additional tuning related ion losses. Gas pressure changes, however, tend to be very slow, even with pulsed valves, and thus unsuited to chromatography coupled methods.

Although the present invention has been described with reference to various embodiments, it will be understood that various changes may be made without departing from the scope of the invention as set out in the accompanying claims.

The invention claimed is:

1. A method of operating a time-of-flight (ToF) mass analyser that is configured to determine a mass to charge ratio (m/z) of ions by determining flight times of ions along an ion path, the method comprising:

operating the time-of-flight (ToF) mass analyser in a first mode of operation, and analysing ions by determining flight times of the ions along the ion path so as to obtain a first set of data, wherein in the first mode of operation (i) the ion path has a first path length, and (ii) the ion path is maintained at a first pressure;

operating the time-of-flight (ToF) mass analyser in a second mode of operation, and analysing ions by determining flight times of the ions along the ion path so as to obtain a second set of data, wherein in the second mode of operation (i) the ion path has a second path length, and (ii) the ion path is maintained at a second pressure, wherein the second path length is different to the first path length and/or the second pressure is different to the first pressure;

comparing an intensity of an ion peak in the first set of data to an intensity of a corresponding ion peak in the second set of data; and determining, based on the comparison and using a calibration for the time-of-flight (ToF) mass analyser, a collision cross section (CCS) of ions associated with the corresponding ion peaks.

2. The method of claim 1, wherein the second path length is greater than the first path length.

3. The method of claim 1, wherein:

the time-of-flight mass analyser comprises one or more ion reflectors;

in the first mode of operation ions are caused to make n reflection(s) in the one or more ion reflectors, wherein n is an integer ≥0; and in the second mode of operation ions are caused to make m reflection(s) in the one or more ion reflectors, wherein m is an integer >n.

4. The method of claim 1, wherein the time-of-flight mass analyser is a multi-reflection time-of-flight (MR-ToF) mass analyser comprising:

two ion mirrors spaced apart and opposing each other in a direction X, each mirror elongated generally along a drift direction Y between a first end and a second end, the drift direction Y being orthogonal to the direction X;

an ion injector for injecting ions into a space between the ion mirrors, the ion injected located in proximity with the first end of the ion mirrors; and a detector for detecting ions after they have completed plural reflections in the ion mirrors, wherein the time-of-flight mass analyser is configured to analyse ions by injecting ions from the ion injector into the space between the ion mirrors, such that the ions follow an ion path having one or more (K) oscillation(s) between the ion mirrors in the direction X whilst drifting in the drift direction Y from the ion injector to the detector.

5. The method of claim 4, wherein:

in the first mode of operation ions are caused to make a first number $K_1$ of oscillation(s) between the ion mirrors in the direction X whilst drifting in the drift direction Y from the ion injector to the detector; and in the second mode of operation ions are caused to make a second different number $K_2$ of oscillations between the ion mirrors in the direction X whilst drifting in the drift direction Y from the ion injector to the detector, wherein the second number of oscillations is greater than the first number of oscillation(s) ($K_2>K_1$).

6. The method of claim 5, wherein:

the multi-reflection time-of-flight (MR-ToF) mass analyser further comprises a deflector or lens located in proximity with the first end of the ion mirrors; and the method comprises controlling the numbers ($K_1$, $K_2$) of oscillation(s) that ions make between the ion mirrors in the direction X whilst drifting in the drift direction Y from the ion injector to the detector by controlling a voltage applied to the deflector or lens.

7. The method of claim 5, wherein:

in the first mode of operation ions are caused to make a single ($K_1=1$) oscillation between the ion mirrors in the direction X whilst drifting in the drift direction Y from the ion injector to the detector; and in the second mode of operation ions are caused to make plural ($K_2>1$) oscillations between the ion mirrors in the direction X whilst drifting in the drift direction Y from the ion injector to the detector.

8. The method of claim 7, wherein in the second mode of operation ions are caused to make (i) $K_2\geq5$, (ii) $K_2\geq10$, (iii) $K_2\geq20$, or (iv) $K_2\geq30$ oscillations between the ion mirrors in the direction X whilst drifting in the drift direction Y from the ion injector to the detector.

9. The method of claim 7, wherein:

the multi-reflection time-of-flight (MR-ToF) mass analyser further comprises a deflector or lens located in proximity with the first end of the ion mirrors;

the method comprises controlling the numbers ($K_1$, $K_2$) of oscillation(s) that ions make between the ion mirrors in the direction X whilst drifting in the drift direction Y from the ion injector to the detector by controlling a voltage applied to the deflector or lens; and analysing ions in the first mode of operation comprises injecting ions from the ion injector into the space between the ion mirrors, wherein the ions are reflected by one of the ion mirrors, travel to the deflector or lens, and are caused to travel from the deflector or lens to the detector via a reflection in the other ion mirror.

10. The method of claim 9, wherein analysing ions in the second mode of operation comprises:

injecting ions from the ion injector into the space between the ion mirrors, wherein the ions follow a zigzag ion path having plural ($K_2>1$) oscillations between the ion mirrors in the direction X whilst: (a) drifting from the deflector or lens along the drift direction Y towards the second end of the ion mirrors, (b) reversing drift direction velocity in proximity with the second end of the ion mirrors, and (c) drifting back along the drift direction Y to the deflector or lens; and then causing the ions to travel from the deflector or lens to the detector for detection.

11. The method of claim 9, wherein analysing ions in the second mode of operation comprises:

(i) injecting ions from the ion injector into the space between the ion mirrors, wherein the ions complete a first pass in which the ions follow a zigzag ion path having plural oscillations between the ion mirrors in the direction X whilst: (a) drifting along the drift direction Y from the deflector or lens towards the second end of the ion mirrors, (b) reversing drift direction velocity in proximity with the second end of the ion mirrors, and (c) drifting back along the drift direction Y to the deflector or lens;

(ii) using the deflector or lens to reverse the drift direction velocity of the ions such that the ions are caused to complete a further pass in which the ions follow a zigzag ion path having plural oscillations between the ion mirrors in the direction X whilst: (a) drifting along the drift direction Y from the deflector or lens towards the second end of the ion mirrors, (b) reversing drift direction velocity in proximity with the second end of the ion mirrors, and (c) drifting back along the drift direction Y to the deflector or lens;

(iii) optionally repeating step (ii) one or more times; and then (iv) causing the ions to travel from the deflector or lens to the detector for detection.

12. The method of claim 4, wherein:

analysing ions in the first mode of operation comprises:

injecting ions from the ion injector into the space between the ion mirrors, wherein the ions follow a zigzag ion path having plural ($K_1$>1) oscillations between the ion mirrors in the direction X whilst: (a) drifting from a deflector or lens along the drift direction Y towards the second end of the ion mirrors, (b) reversing drift direction velocity in proximity with the second end of the ion mirrors, and (c) drifting back along the drift direction Y to the deflector or lens; and then causing the ions to travel from the deflector or lens to the detector for detection; and analysing ions in the second mode of operation comprises:

(i) injecting ions from the ion injector into the space between the ion mirrors, wherein the ions complete a first pass in which the ions follow a zigzag ion path having plural oscillations between the ion mirrors in the direction X whilst: (a) drifting along the drift direction Y from the deflector or lens towards the second end of the ion mirrors, (b) reversing drift direction velocity in proximity with the second end of the ion mirrors, and (c) drifting back along the drift direction Y to the deflector or lens;

(ii) using the deflector or lens to reverse the drift direction velocity of the ions such that the ions are caused to complete a further pass in which the ions follow a zigzag ion path having plural oscillations between the ion mirrors in the direction X whilst: (a) drifting along the drift direction Y from the deflector or lens towards the second end of the ion mirrors, (b) reversing drift direction velocity in proximity with the second end of the ion mirrors, and (c) drifting back along the drift direction Y to the deflector or lens;

(iii) optionally repeating step (ii) one or more times; and then (iv) causing the ions to travel from the deflector or lens to the detector for detection.

13. The method of claim 1, wherein the first pressure is approximately equal to the second pressure.

14. The method of claim 1, wherein the second pressure is greater than the first pressure.

15. The method of claim 1, wherein comparing the intensity of the ion peak in the first set of data to the intensity of the corresponding ion peak in the second set of data comprises: determining a ratio of the intensity of the ion peak in the first set of data to the intensity of the corresponding ion peak in the second set of data; and determining the collision cross section (CCS) of the ions associated with the corresponding ion peaks comprises: using the ratio and the calibration to determine the collision cross section (CCS) of the ions associated with the corresponding ion peaks, wherein the calibration relates intensity ratios to collision cross section (CCS) values.

16. A method of operating a time-of-flight (ToF) mass analyser that is configured to determine a mass to charge ratio (m/z) of ions by determining flight times of ions along an ion path, the method comprising:

operating the time-of-flight (ToF) mass analyser in a first mode of operation, and analysing ions by determining flight times of the ions along the ion path so as to obtain a first set of data, wherein in the first mode of operation (i) the ion path has a first path length, and (ii) the ion path is maintained at a first pressure;

operating the time-of-flight (ToF) mass analyser in a second mode of operation, and analysing ions by determining flight times of the ions along the ion path so as to obtain a second set of data, wherein in the second mode of operation (i) the ion path has a second path length, and (ii) the ion path is maintained at a second pressure, wherein the second path length is different to the first path length and/or the second pressure is different to the first pressure;

comparing an intensity of an ion peak in the first set of data to an intensity of a corresponding ion peak in the second set of data;

determining, based on the comparison, a collision cross section (CCS) of ions associated with the corresponding ion peaks; and operating the time-of-flight (ToF) mass analyser in a mass analysis mode of operation, wherein in the mass analysis mode of operation the ion path is maintained at a third pressure, wherein the third pressure is less than the first and second pressures.

17. A method of determining a calibration for a time-of-flight (ToF) mass analyser that is configured to determine a mass to charge ratio (m/z) of ions by determining flight times of ions along an ion path, the method comprising:

operating the time-of-flight (ToF) mass analyser in a first mode of operation, and analysing calibrant ions by determining flight times of the calibrant ions along the ion path so as to obtain a first set of data, wherein in the first mode of operation (i) the ion path has a first path length, and (ii) the ion path is maintained at a first pressure;

operating the time-of-flight (ToF) mass analyser in a second mode of operation, and analysing calibrant ions by determining flight times of the calibrant ions along the ion path so as to obtain a second set of data, wherein in the second mode of operation (i) the ion path has a second path length, and (ii) the ion path is maintained at a second pressure, wherein the second path length is different to the first path length and/or the second pressure is different to the first pressure;

determining a plurality of ratios, wherein each ratio is a ratio of an intensity of an ion peak in the first set of data to an intensity of a corresponding ion peak in the second set of data; and using each ratio together with a known collision cross section (CCS) value for calibrant ions associated with that ratio to determine a calibration for the time-of-flight (ToF) mass analyser.

18. An analytical instrument comprising:

a time-of-flight (ToF) mass analyser configured to determine the a mass to charge ratio (m/z) of ions by determining flight times of ions along an ion path; and a control system configured to:

operate the time-of-flight (ToF) mass analyser in a first mode of operation, and analyse ions by determining flight times of the ions along the ion path so as to obtain a first set of data, wherein in the first mode of operation (i) the ion path has a first path length, and (ii) the ion path is maintained at a first pressure;

operate the time-of-flight (ToF) mass analyser in a second mode of operation, and analyse ions by determining flight times of the ions along the ion path so as to obtain a second set of data, wherein in the second mode of operation (i) the ion path has a second path length, and (ii) the ion path is maintained at a second pressure, wherein the second path length is different to the first path length and/or the second pressure is different to the first pressure;

compare an intensity of an ion peak in the first set of data to an intensity of a corresponding ion peak in the second set of data; and determine, based on the comparison and using a calibration for the time-of-flight (ToF) mass analyser, a collision cross section (CCS) of the ions associated with the corresponding ion peaks.

19. The analytical instrument of claim 18, wherein the second path length is greater than the first path length.

20. The analytical instrument of claim 18, wherein:

the time-of-flight (ToF) mass analyser comprises one or more ion reflectors;

in the first mode of operation ions are caused to make n reflection(s) in the one or more ion reflectors, wherein n is an integer ≥0; and in the second mode of operation ions are caused to make m reflection(s) in the one or more ion reflectors, wherein m is an integer >n.

21. An analytical instrument comprising:

a mass analyser configured to determine a mass to charge ratio (m/z) of ions by determining flight times of ions along an ion path; and a control system configured to:

operate the mass analyser in a first mode of operation, and analyse ions by determining flight times of the ions along the ion path so as to obtain a first set of data, wherein in the first mode of operation (i) the ion path has a first path length, and (ii) the ion path is maintained at a first pressure;

operate the mass analyser in a second mode of operation, and analyse ions by determining flight times of the ions along the ion path so as to obtain a second set of data, wherein in the second mode of operation (i) the ion path has a second path length, and (ii) the ion path is maintained at a second pressure, wherein the second path length is different to the first path length and/or the second pressure is different to the first pressure;

compare an intensity of an ion peak in the first set of data to an intensity of a corresponding ion peak in the second set of data; and determine, based on the comparison, a collision cross section (CCS) of the ions associated with the corresponding ion peaks, wherein the control system is further configured to:

operate the mass analyser in a mass analysis mode of operation, wherein in the mass analysis mode of operation the ion path is maintained at a third pressure, wherein the third pressure is less than the first and second pressures.

* * * * *